(12) United States Patent
Donovan et al.

(10) Patent No.: US 12,225,015 B2
(45) Date of Patent: Feb. 11, 2025

(54) GENERATING AND IMPLEMENTING ORGANIZATIONAL SECURITY POLICIES

(71) Applicant: People Center, Inc., San Francisco, CA (US)

(72) Inventors: James Arthur Donovan, San Francisco, CA (US); Adam Vy Donovan, San Francisco, CA (US)

(73) Assignee: People Center, Inc., San Francisco, CA (US)

( * ) Notice: Subject to any disclaimer, the term of this patent is extended or adjusted under 35 U.S.C. 154(b) by 710 days.

(21) Appl. No.: 17/328,614

(22) Filed: May 24, 2021

(65) Prior Publication Data

US 2022/0286460 A1    Sep. 8, 2022

Related U.S. Application Data

(60) Provisional application No. 63/156,282, filed on Mar. 3, 2021.

(51) Int. Cl.
*H04L 29/06*  (2006.01)
*H04L 9/40*   (2022.01)
*H04L 41/22*  (2022.01)

(52) U.S. Cl.
CPC .......... *H04L 63/102* (2013.01); *H04L 41/22* (2013.01); *H04L 63/083* (2013.01); *H04L 63/105* (2013.01); *H04L 63/20* (2013.01)

(58) Field of Classification Search
CPC ..... H04L 63/102; H04L 41/22; H04L 63/083; H04L 63/105; H04L 63/20; H04L 63/1466; G06F 21/6218; G06F 21/46
See application file for complete search history.

(56) References Cited

U.S. PATENT DOCUMENTS

| | | | |
|---|---|---|---|
| 7,185,192 B1* | 2/2007 | Kahn | G06F 21/6218 707/999.102 |
| 2018/0115587 A1* | 4/2018 | Roth | H04L 63/20 |
| 2019/0007443 A1* | 1/2019 | Cook | H04L 63/20 |
| 2019/0327271 A1* | 10/2019 | Saxena | G06F 8/38 |

* cited by examiner

*Primary Examiner* — Baotran N To
(74) *Attorney, Agent, or Firm* — Dority & Manning, P.A.

(57) ABSTRACT

Methods, systems, devices, and tangible non-transitory computer readable media for generating and implementing security policies are provided. The disclosed technology can include accessing a security request associated with generating a security policy based in part on organizational data that includes one or more organizational records. The security request can include one or more rules associated with the security policy. Based at least in part on the security request, the one or more rules that are in compliance with one or more policies associated with the organizational data can be determined. Furthermore, the security policy can be generated based at least in part on the one or more rules that are in compliance with the one or more policies. Furthermore, operations associated with implementing the security policy can be performed.

20 Claims, 9 Drawing Sheets

GENERATING AND IMPLEMENTING ORGANIZATIONAL SECURITY POLICIES

RELATED APPLICATIONS

This application claims priority to and the benefit of U.S. Provisional Patent Application No. 63/156,282, filed Mar. 3, 2021. U.S. Provisional Patent Application No. 63/156,282 is hereby incorporated by reference in its entirety.

FIELD

The present disclosure relates generally to implementing policies to manage computing systems and applications. More particularly, the present disclosure relates to implementing security policies based on organizational records.

BACKGROUND

Computing systems can be used as platforms on which various devices and/or applications, including software applications, are accessed and modified by users. Management of those devices and/or applications and the information associated with those devices and/or applications can include the use of security policies that regulate access by, for example, authenticating users of the systems. Further, management of the computing systems can be used to protect information that a user or an organization wishes to keep private or otherwise confidential.

Safekeeping this information can be achieved through the use of security policies that use various techniques to ensure that unauthorized access of information is prevented. Further, in an organizational setting, the effectiveness of a security policy may be balanced with the need to maintain ease of use so that unnecessary friction is not added to operations within the organization. As such, increasing the ease of use in generating and implementing security policies can lead to improved security that can be flexibly modified based on dynamic user needs and conditions. Accordingly, there exists a demand for a more effective way of generating and implementing security policies within an organization's computing system.

SUMMARY

Aspects and advantages of embodiments of the present disclosure will be set forth in part in the following description, or can be learned from the description, or can be learned through practice of the embodiments.

One example aspect of the present disclosure is directed to a computing system for implementing security policies, the computing system comprising: one or more processors; and one or more non-transitory computer-readable media that store instructions that, when executed by the one or more processors, cause the computing system to perform operations. The operations can include receiving an access request associated with a particular employee and a particular computing resource. The operations can include accessing a user-customized security policy associated with the particular user or the particular computing resource, wherein the user-customized security policy is defined using one or more references to a set of organizational data that includes employee data records for employees of an organization. The operations can include determining a policy evaluation outcome based at least in part on a comparison of the one or more references to the set of organizational data with an employee data record associated with the particular employee. The operations can include providing a response to the access request based at least in part on the policy evaluation outcome.

In some implementations, the user-customized security policy includes one or more query language expressions. In some implementations, determining the policy evaluation outcome can include: executing the one or more query language expressions against the set of organizational data to determine a query result; and determining the policy evaluation outcome based at least in part on the query result.

One example aspect of the present disclosure is directed to one or more non-transitory computer-readable media that store instructions that, when executed by a computing system, cause the computing system to perform operations to implement security policies at employee onboarding. The operations can include receiving one or more user-customized security policies, wherein each of the user-customized security policies is defined using one or more references to a set of organizational data that includes employee data records for employees of an organization. The operations can include obtaining a new employee data record associated with a new employee of the organization. The operations can include comparing the new employee data record with the one or more references to the set of organizational data included in each of the one or more user-customized security policies to determine an employee-specific set of security policies from the one or more user-customized security policies that apply to the new employee. The operations can include associating the employee-specific set of security policies with the new employee.

In some implementations, each user-customized security policy includes one or more query language expressions. In some implementations, comparing, by the computing system, the new employee data record with the one or more references to the set of organizational data included in each of the one or more user-customized security policies can include, for each security policy: executing the one or more query language expressions against the set of organizational data to determine a query result; and determining, by the computing system, whether the policy applies to the new employee based at least in part on the query result.

One example aspect of the present disclosure is directed to a computer-implemented method of implementing security policies. The computer-implemented method can include accessing, by a computing system that includes one or more processors, a security request associated with generating a security policy based at least in part on organizational data which can include one or more organizational records. The security request can include one or more rules associated with the security policy. The computer-implemented method can include determining, by the computing system, based at least in part on the security request, the one or more rules that are in compliance with one or more policies associated with the organizational data. The computer-implemented method can include generating, by the computing system, the security policy based at least in part on the one or more rules that are in compliance with the one or more policies. The computer-implemented method can include performing, by the computing system, one or more operations associated with implementing the security policy.

Another example aspect of the present disclosure is directed to one or more tangible non-transitory computer-readable media storing computer-readable instructions that when executed by one or more processors cause the one or more processors to perform operations. The operations can include accessing a security request associated with generating a security policy based at least in part on organizational data that can include one or more organizational records. The security request can include one or more rules associated with the security policy. The operations can include determining, based at least in part on the security request, the one or more rules that are in compliance with one or more policies associated with the organizational data. The operations can include generating the security policy based at least in part on the one or more rules that are in compliance with the one or more policies. The operations can include performing one or more operations associated with implementing the security policy.

Another example aspect of the present disclosure is directed to a computing system that includes: one or more processors; one or more non-transitory computer-readable media storing instructions that when executed by the one or more processors cause the one or more processors to perform operations. The operations can include accessing a security request associated with generating a security policy based at least in part on organizational data can include one or more organizational records. The security request can include one or more rules associated with the security policy. The operations can include determining, based at least in part on the security request, the one or more rules that are in compliance with one or more policies associated with the organizational data. The operations can include generating the security policy based at least in part on the one or more rules that are in compliance with the one or more policies. The operations can include performing one or more operations associated with implementing the security policy.

In some implementations, the operations can include detecting one or more changes in the organizational data. The one or more changes can include the addition of an organizational record, the deletion of an organizational record, or the modification of an organizational record. Further, the one or more operations can include, generating the security request in response to detecting the one or more changes in the organizational data. The one or more rules of the security request can be based at least in part on the one or more changes in the organizational data. Furthermore the modification of the organizational record can include modification of a status of a user associated with the organizational record, modification of an organizational division of the user associated with the organizational record, or modification of a geographic area of the user associated with the organizational record.

Thus, in some implementations, changes to an underlying organizational record for an existing employee can result in automatically updated changes to one or more security policies for that employee is then automatically updated. In one example, the employee can be promoted or join a different division, or the employee can change geographic locations. In some implementations, a security request can include recognition of such a change to the underlying organizational record for a new or existing employee.

Other aspects of the present disclosure are directed to various systems, apparatuses, non-transitory computer-readable media, user interfaces, and devices for the generation and implementation of security policies.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
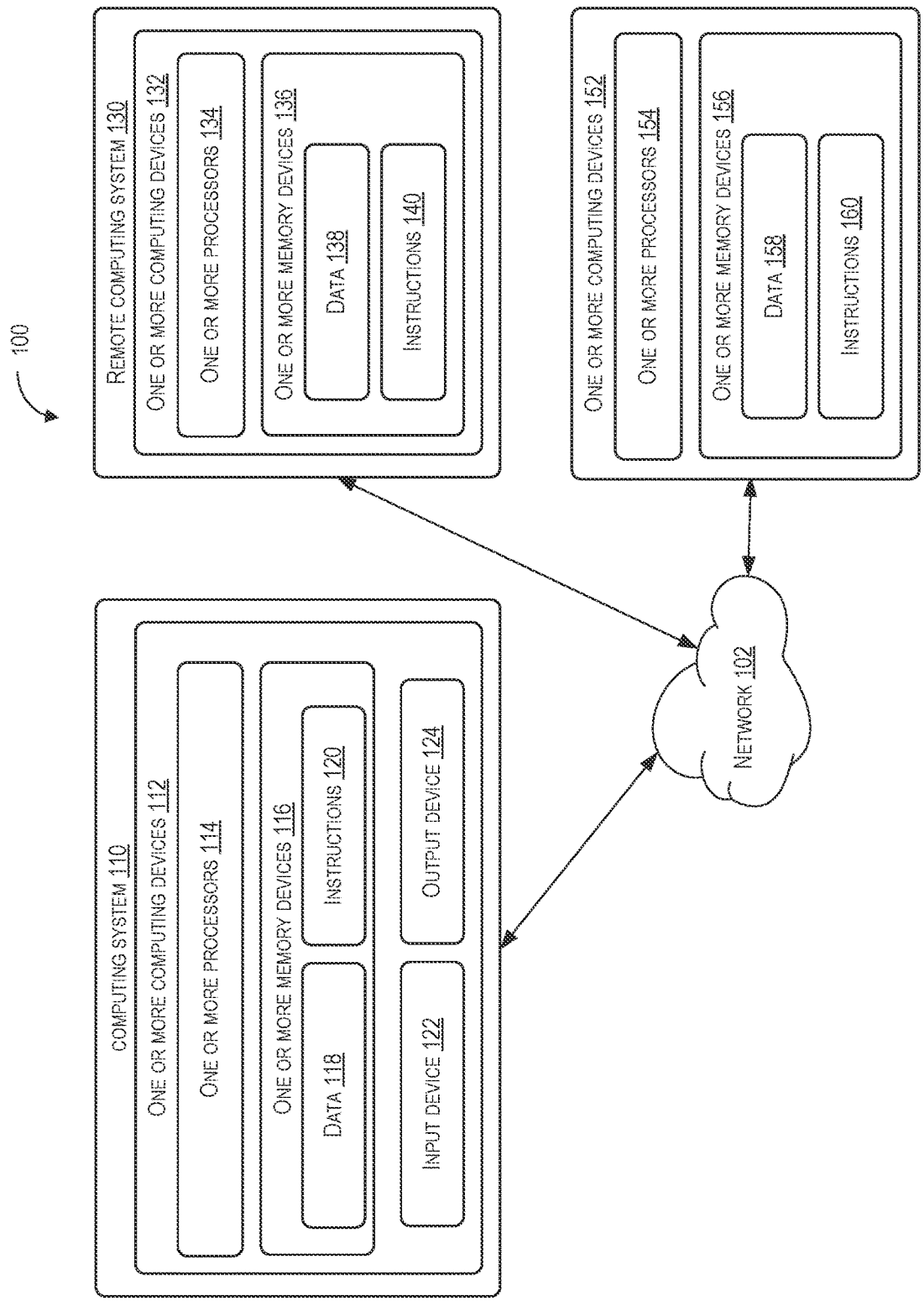
FIG. 1 depicts a block diagram of an example environment including a computing system that performs operations according to example embodiments of the present disclosure.

Reference numerals that are repeated across plural figures are intended to identify the same features in various implementations.

DETAILED DESCRIPTION

The present disclosure is generally directed to the generation and implementation of security policies. In particular, example aspects of the present disclosure are directed to a computing system that can be used to generate or configure security policies that can be used to regulate access, authentication, and/or modification of applications, computing devices, and/or data, including intermediated access to third party applications. Further, the computing system described herein can provide specific benefits to the creation and customization of security policies for an organization that manages applications, computing devices, and data for a large group of users. For example, the disclosed technology can facilitate the creation of a custom security policy that complies with existing policies while also providing administrators with a user friendly way of adding rules that may be used to customize policies for particular groups of users. In this way, a security administrator or other user of the disclosed technology can implement new security policies which are custom tailored to certain groups of users while not conflicting with existing security policies.

Example aspects of the present disclosure are directed to an organizational management platform that controls and leverages organizational data to enable the automatic creation and implementation of different security policies which are customized for different users or groups of users (e.g., groups of employees) included in a set of users (e.g., all employees of an organization). In particular, an organizational management platform can control and leverage organizational data to manage organizational applications such as payroll, operations, human resources (e.g., onboarding and offboarding), benefits, information technology and device management, third-party application integration and access, and many others.

The organizational management platform can hold, for each of one or more organizations, a centralized set of organizational data that acts as a single, centralized system of record for all organizational management processes for that organization. Each organization can include a number of users which are able to access and interact with the organizational management platform. Some users may have administrative permissions which define whether the user is able to access and/or modify certain types of organizational data for their organization.

The organizational data for each organization can include data directly entered into the organizational management platform and/or can include data retrieved, pulled, or otherwise obtained from one or more first party and/or third-party applications with which the organizational management platform may have varying levels of integration. This ingestion and storage of data from third-party applications is in contrast to systems which simply sit on top of third-party applications and apply rules at run time. In some implementations, the organizational management platform can provide a user with the ability (e.g., by configuring Simple Mail Transfer Protocol (SMTP) settings) to configure the cadence or periodicity at which the organizational management platform receives or ingests data (e.g., via .csv files) from third-party applications.

The organizational data can, in some implementations, be held as one or more object databases. For example, multiple object classes can be defined in the object databases. Example object classes include employees, devices, job candidates, benefits policies, documents, pay instances, time cards, and/or other objects. For each object, values can be provided and maintained for one or more attributes, such as location, role, salary, etc. Links can be made between different objects. For example, one or more device objects can be associated with employee objects.

The object database(s) can be represented as or can store data which can be represented as one or more graphs with nodes that correspond to objects and edges that correspond to links or logical associations between objects and/or object attribute(s). Graph(s) can be traversed to understand or leverage relationships among objects and their attribute(s). In one example, the organizational data can be synthesized into a single graph which includes multiple classes of objects and defines complex relationships among objects and their attribute(s). For example, all workflows, including payroll, IT, etc. can be run through one platform and graph.

In some implementations, the organizational data can include organizational structure data. For example, the organizational structure data can be encoded within links or edges defined between objects of the organizational data or can be stored as a separate data layer. For example, the organizational structure data can define organizational relationships between objects, including employee objects. As one example, the organizational structure data may indicate that a first employee object has the relationship of "manager" relative to a second employee object. The organizational relationships can be defined between specific objects and/or groups of objects. As another example, the organizational structure data may indicate that a first group of employees (e.g., the "IT Administrator" group of employees) has a certain set of permissions (e.g., device activation/deactivation) relative to a particular group of devices (e.g. the "work laptops" group of the devices).

According to one example aspect, a security administrator or other user of the organizational management platform can be enabled to define a security policy that is a function of or defined according to the organizational data. When used to define or implement security policies, the organizational management platform may be referred to as a security policy computing system.

Thus, different security policies can be defined for different users or groups of users on the basis of the organizational data. When a user seeks to access, control, and/or modify one or more devices, applications, and/or datasets, the appropriate security policy can be accessed and evaluated based on the organizational data associated with the user.

As one simplified example, an employee group "IT administrators" which is defined within the organizational data can have a security policy (e.g., different minimum length) versus another employee group "interns" which is also defined within the organizational data. Thus, when a user who is a member of the IT administrators employee group seeks to access her device, the custom policy defined for the IT administrators employee group can be applied to evaluate her access request.

According to another example aspect, in some implementations, some or all of the custom security policies can be defined using or can be a function of one or more expressions written in a query language. The expressions in the query language may include one or more queries which query against the organizational data to return a result.

For example, the query language can be a domain-specific query language that can be used to perform (e.g., in real time) queries against the organizational data. The query language can be used to define functions or queries which return data that satisfies or responds to the functions or queries. In some implementations, the query language is a declarative language. In some implementations, the query language includes organization functions or operators which leverage organizational relationships within the organizational data. For example, the organization function ORG (employee, relationship) returns one or more other employees that have the specified relationship to the specified employee.

As described above, an administrator or other user of the system can generate and cause implementation of customized security policies which are expressed using one or more query expressions which query against a set of organizational data. This enables linking the organizational data (e.g., human resources data or other employee data) to device management, application access/control, and/or other forms of access rights management. As such, a single, core source of organizational data can flow through to custom security policies. The security policies can define rules about software installations or other settings, including push settings.

One benefit of this connection between security policies and the organizational data is the security policies can track with and be robust against dynamic and/or real-time changes to the organizational data such as the employee record. To provide an example, assume an employee moves from California to Tokyo. The employee record is updated in the core system of record. As a result, automatic changes can be made to device(s) linked to that employee based on the change, including, for example, reinstalling various software programs with different licenses or other security policies.

In another example, security policies can include behavioral detection. One example behavioral detection is screening for impossible velocity between two logins or two login attempts. Behavioral detection policies can also be defined with or include query language expressions. Such expressions can be evaluated against organizational data and/or activities or actions performed within the management platform. For example, an expression can return a positive result if users of a certain group (e.g., contractors) perform a certain action (e.g., download data off the platform to an external data storage location). In one example, if a query language expression returns a positive result (e.g., a detection of certain behavior), then a security alert can be issued. Thus, suspicious use of a particular employee's login across the system in a way that is non-standard can trigger an extra layer of security.

In some embodiments, when the security policies result in the detection of a suspicious or illegitimate behavior, an additional layer of security associated with the employee associated with the suspicious or illegitimate behavior can be implemented. For example, when a suspicious behavior associated with an employee is detected, additional security policies associated with that employee's applications, computing devices, and/or organizational records (e.g., employee records) can be implemented. In particular, the new security policies may require an employee to pass additional security requirements (e.g., two-factor authentication or predetermined security questions) to gain access to their applications, computing devices, and/or organizational records. Furthermore, in some embodiments, the detection of a suspicious or illegitimate behavior on the part of one employee may cause the introduction of an additional layer of security for an organizational division associated with the employee. For example, if an organizational division includes fifty (50) employees, the detection of suspicious or illegitimate behavior associated with a single employee may result in an additional layer of security policies being imposed on all fifty (50) employees in the organizational division.

In some implementations, the security policy computing system can include a graphical user interface that provides an easy way to create security policies with a relatively low level of user foreknowledge. For example, a user can create a security policy for a user or group of users by selecting rules that are provided via the graphical user interface. In this way, the potentially complicated process of using specialized expressions and queries can be avoided or significantly reduced. Instead, the user can create precise security policies via a front-end that allows the user to build the security policy quickly and easily without sacrificing specificity or coverage of users.

By way of example, a computing system implementing the disclosed technology can access a security request that is used to generate a security policy that is based in part on organizational data and includes rules that constrain users associated with the organizational data. For example, the security policy can use user identifiers and user groupings to apply access constraints to applications used by different user groupings (e.g., organizational divisions). The computing system can then determine the rules that are in compliance with policies associated with the organizational data.

For example, the computing system can determine whether the rules conflict with existing policies and whether the security request authorizes a rule to supersede an existing policy. The rules that comply with the existing policies can then be used as part of a security policy that is generated. The computing system can then implement the security policy by applying the rules to applications and/or hardware devices associated with the users in an organization.

Accordingly, the disclosed technology may improve the effectiveness with which security policies are generated and/or implemented. In particular, the disclosed technology can facilitate the creation of a security policy through a user friendly interface through which an authorized user can create a security policy without the burdensome need to remember complex rules or queries. Further, the disclosed technology can leverage organizational data as the basis for security policies, by pulling relevant information from one or more organizational records that may be structured in a way that allows for efficient security rules that correspond to organizational structures and hierarchies.

The computing system can receive, access, obtain, and/or retrieve an access request associated with a particular employee and a particular computing resource. The access request can include information associated with the name of an employee of the organization and a request for that employee to access a particular computing resource of the organization. For example, the access request can include a request for permission and/or authorization for a particular employee to access a particular laptop computing device and/or to have access to a particular software application.

The computing system can access, receive, obtain, and/or retrieve, a user-customized security policy associated with the particular employee and/or the particular computing resource. Further, the user-customized security policy can be defined using one or more references to a set of organizational data that includes employee data records for employees of an organization. For example, the user-customized security policy can be used to define an amount of access to computing resources of an organization that a particular employee is permitted to have. In particular, the user-customized security policy can use the one or more references to access the portions of an employee data record associated with an employee's access to various computing devices (e.g., laptop computing devices) and computing resources (e.g., particular software applications).

The computing resources of the organization can include one or more computing devices and/or one or more applications (e.g., one or more software applications). The one or more computing devices may include different types of computing devices (e.g., laptop computing devices, smartphones, and/or tablet computing devices) as well as uniquely identified computing devices of the same type (e.g., the same type of laptop uniquely configured for use by a particular employee). Further, the one or more applications can include different types of software applications (e.g., payroll applications, version control applications, and/or messaging applications) as well as different levels of access associated with each of the software applications, such that access to a particular application can be limited to a defined group of employees.

The computing system can determine a policy evaluation outcome based at least in part on a comparison of the one or more references to the set of organizational data with an employee data record associated with the particular employee. The employee data record can include an employee's name, a unique identifier associated with the particular employee, and access permissions associated with the particular employee. For example, if the one or more references are associated with whether an employee has permission to access a particular software application, the computing system can access the employee data record of the particular employee and query the employee data record to determine whether that particular employee has access to that particular software application. The employee data record can include information associated with which software applications the particular employee has permission to access, and based on the comparison, the computing system can determine whether the employee is authorized to access the particular software application.

In some embodiments, if the employee is authorized to access that particular software application then the policy evaluation outcome can be associated with a first set of outcomes. Further, if the employee is not authorized to access that particular software application then the policy evaluation outcome can be associated with another set of outcomes that is different from the first set of outcomes. For example, if the employee is authorized to access that particular software application then the policy evaluation outcome can be positive. Further, if the employee is not authorized to access that particular software application then the policy evaluation outcome can be non-positive (e.g., negative).

The computing system can provide a response to the access request based at least in part on the policy evaluation outcome. Further, different policy evaluation outcomes can result in different responses. For example, if the policy evaluation outcome is positive and indicates that the one or more references to the set of organizational data are in accordance with an employee data record associated with the particular employee then the computing system can perform one or more operations associated with a positive response. Further, the computing system can grant the particular employee access to a particular computing resource if the policy evaluation outcome is positive.

If the policy evaluation outcome is not positive (e.g., negative) and indicates that the one or more references to the set of organizational data are not in accordance with an employee data record associated with the particular employee then the computing system can perform one or more operations associated with a non-positive (e.g., negative) response. Further, the computing system can refuse the particular employee access to a particular computing resource if the policy evaluation outcome is negative.

For example, the access request can include a request to access a particular computing resource (e.g., a payroll application used by an accounting department of an organization) to which access is limited based on the employee's rank within the organization or the employee having membership in the particular department that uses the computing application. Based on a determination that the particular employee is a member of the accounting department, the computing system can permit the particular employee to access the payroll application.

If the policy evaluation outcome indicates that the particular employee and the particular computing resource are not in compliance with the security policy, then the computing system will not grant the particular employee access to the particular computing resource. For example, the access request can include a request to access a particular computing resource (e.g., a set of the organizational database that includes the salaries of an organization's employees) to which access is limited based on the employee's rank within the organization. Based on a determination that the particular employee does not have a rank with the privilege of viewing the salaries of the organization's employees, the computing system can refuse the particular employee from accessing salaries of the organization's employees.

In some embodiments, the user-customized security policy can include one or more query language expressions. The one or more query language expressions can be executed against the one or more references to the set of organizational data. Further, determining the policy evaluation outcome can include executing the one or more query language expressions against the set of organizational data to determine a query result. For example, the one or more query language expressions when executed against the organizational data can determine a query result that indicates whether a particular employee has access permissions for a particular software application.

In some embodiments, determination of the policy evaluation outcome can be based at least in part on the query result. For example, if the query result indicates that a particular employee has permission to access a particular computing resource, the policy evaluation outcome can reflect that the employee has permission to access that particular computing resource. However, if the query result indicates that a particular employee does not have permission to access a particular computing resource, the policy evaluation outcome can reflect that the employee does not have permission to access that particular computing resource.

The computing system can receive, access, obtain, and/or retrieve one or more user-customized security policies. Each of the one or more user-customized security policies can be defined using one or more references to a set of organizational data that includes employee data records for employees of an organization. For example, the one or more user-customized security policies can be used to define an amount of access to computing resources of an organization that each of the employees is permitted to have. In particular, the user-customized security policy can use the one or more references to access the portions of the employee data records associated with each of the employees access to various computing devices (e.g., laptop computing devices) and computing resources (e.g., particular software applications).

The computing system can obtain a new employee data record associated with a new employee of the organization. For example, the computing system can obtain a new employee record from the employee data records associated with the employees that were hired within some predetermined time of the current time (e.g., an employee hired in the most recent week).

The computing system can compare the new employee data record with the one or more references to the set of organizational data included in each of the one or more user-customized security policies to determine an employee-specific set of security policies from the one or more user-customized security policies that apply to the new employee. For example, if the one or more references are associated with whether a new employee has permission to access particular files stored on an organization's database (e.g., confidential employee files in a different department from the new employee's department), the computing system can use the comparison of the new employee data record with the one or more references to the set of organizational data to determine whether that particular employee has permission to access those particular files of the organization's database. The new employee data record can include information associated with which database files that the new employee has permission to access, and based on the comparison, the computing system can determine an employee-specific set of security policies from the one or more user-customized security policies that apply to the new employee.

The computing system can associate the employee-specific set of security policies with the new employee. For example, the computing system can add the new employee to the set of employees to which the employee-specific set of security policies are applicable.

Each of the user-customized security policies can include one or more query language expressions. The one or more query language expressions can be used to select and/or retrieve certain portions of the set of organizational data. Further, the one or more query language expressions can include one or more conditions that can be used to constrain the set of the organizational data that is returned as a result of a query composed of the one or more query language expressions. For example, the one or more query language expressions can include an expression to reference portions of the set of the organizational data associated with any new employees (e.g., employees added within the most recent week) that have been added to an organization and the respective access permissions respectively associated with the new employees.

In some embodiments, comparing the new employee data record to the one or more references to the set of organizational data can include executing one or more query language expressions against the set of organizational data to determine a query result. For example, when the one or more query language expressions are executed against the set of organizational data, the computing system can generate a query result that indicates whether the user-customized security policy applies to the new employee who has the access permissions to access the set of computing devices. In some embodiments, the query result can include a Boolean result (e.g., true or false) that can indicate whether the user-customized security policy is applicable to a new employee. For example, the Boolean result can indicate "true" if the user-customized security policy is applicable to a new employee or "false" if the user-customized security policy is not applicable to a new employee.

Further, comparing the new employee data record to the one or more references to the set of organizational data can also include determining whether the policy applies to the new employee based at least in part on the query result. For example, the one or more query language expressions can be configured to use the query result can determine that the user-customized security policy is applicable to the new employee if the query result returns "true" or "positive" and that the user-customized security policy is not applicable to the new employee if the query result returns "false" or "non-positive."

The computing system can access, receive, obtain, and/or retrieve data. The data (e.g., security request data) can include a security request. The security request can be associated with generating a security policy based at least in part on organizational data. The organizational data can include one or more organizational records. For example, the one or more organizational records can include information associated with one or more employee records, one or more applications, and/or one or more computing devices. Furthermore, the security policy can use the information in the organizational data to implement the security policy. For example, the organizational data can include the name of an employee and the employee's respective status, which can be used by the security policy to determine an amount of access that is permitted to the employee.

Further, the security request can include one or more rules associated with the security policy. Further, the one or more rules can include one or more constraints and/or one or more limitations that can be used to regulate access, authentication, and/or authorization associated with the organizational data. For example, the one or more rules can constrain the one or more users/employees of an organization that are permitted to access certain applications and/or computing devices. Further, the one or more rules can determine the one or more users/employees of an organization that are authorized to provide other users/employees of the organization with permission to access certain applications and/or computing devices.

In some embodiments, the one or more rules can include one or more access rules to limit a number of times an application associated with the one or more organizational records can be accessed within a predetermined time period. For example, the one or more access rules can set a limit of two application login attempts per minute. By way of further example, the one or more access rules can set a limit of three incorrect login attempts before the application is deactivated until the application is reactivated by a user with authorization to perform the reactivation.

In some embodiments, the organizational data can include information associated with one or more organizational divisions. Further, each of the one or more organizational divisions can be associated with a portion of the one or more organizational records. For example, an organizational record can indicate that a user is associated with a particular division that has certain access privileges and the privileges of the division can be conferred on the individual user based on their membership in the organizational division and without having to individually assign the privilege.

In some embodiments, the security policy is implemented on the one or more organizational divisions. For example, the security policy can be implemented on an organizational division such that the members of the organizational division can have a security policy that applies to the one or more applications and/or one or more computing devices assigned to the members of that organizational division and without having to individually implement different security policies for different sets of applications or devices.

The computing system can determine the one or more rules that are in compliance with one or more policies associated with the organizational data. Determining the one or more rules that are in compliance with the one or more policies can be based at least in part on the security request. For example, the computing system can compare the one or more rules to the one or more policies to determine whether there are differences or similarities that would result in the one or more rules complying with the one or more policies.

In some embodiments, the one or more policies can include one or more access policies that define one or more users that are permitted to access one or more applications associated with the one or more organizational records. For example, the one or more access policies can determine that the users associated with a particular engineering team indicated in the organization data can access a particular application.

In some embodiments, determining the one or more rules that are in compliance with one or more policies associated with the organizational data can include comparing the request authorization level associated with the one or more rules to the one or more policy authorization levels associated with the one or more policies. For example, the one or more rules and the one or more policies can include one or more respective fields and one or more corresponding field values. The computing system can compare the one or more fields and one or more corresponding field values to determine whether some predetermined portion of the one or more fields and one or more field values are in common between the one or more rules and the one or more policies.

Further, determining the one or more rules that are in compliance with one or more policies associated with the organizational data can include determining that the one or more rules are in compliance with the one or more policies if the request authorization level is equal to or greater than the one or more policy authorization levels. If the request authorization level associated with the security request is greater than the one or more policy authorization policies the security request can supersede the one or more policies (e.g., the security request can create a security policy that is an exception to the one or more policies or a replacement of the one or more policies that are currently being implemented).

The computing system can generate the security policy based at least in part on the one or more rules that are in compliance with the one or more policies. Further, the computing system can use the one or more rules that do not violate the one or more policies to generate the security request. For example, the one or more rules can include a rule requiring access by a particular set of users to be from a particular set of computing devices and the one or more policies may allow access to another set of users from any device. The one or more rules may comply with the one or more policies if the set of users associated with the rule and the other set of users associated with the policy do not overlap. Further, the one or more rules may comply with the one or more policies if the one or more rules supersede the one or more policies due to the security request being associated with a request authorization level that is higher than one or more policy authorization levels.

The computing system can perform one or more operations associated with implementing the security policy on the organizational data. Further, the computing system can modify permissions associated with one or more applications based at least in part on constraints (e.g., access constraints) associated with the security policy. For example, the computing system can access a remote security policy of an application and modify the remote security policy based on the security policy. The remote security policy (which is based on the security policy) will then apply to one or more users of the application. By way of further example, the security policy can apply certain conditions (e.g., a minimum password length) to a group of users associated with a certain division within an organization. Application of the security policy to the group can be based at least in part on the organizational data that can be used to determine what division of an organization a user is associated with.

In some embodiments, the one or more rules can be based at least in part on an application specific query language that is associated with the security policy. For example, the one or more rules can be based at least in part on an expression that is created using an application specific query language that may be configured to access the organizational data and/or an application that manages the organizational data.

In some embodiments, the portion of the one or more organizational records in the one or more organizational divisions can be organized in accordance with a hierarchical ranking in which the one or more organizational records are respectively associated with one or more statuses. The security policy can be implemented on the one or more organizational records that are associated with the same one or more organizational divisions and have an equal status or lower status. For example, the security policy can apply to the one or more organizational records that have a particular status within an organization without affecting the one or more organizational records associated with a higher ranking.

The computing system can receive one or more inputs via a graphical user interface that is configured to display one or more interface elements associated with the one or more rules. For example, the computing system can use the one or more inputs that are used to select one or more interface elements that are respectively associated with the one or more rules used to generate the security policy. For example, the one or more inputs can be associated with selecting a group of users that will be subject to a security policy.

The computing system can generate the security request based at least in part on the one or more inputs. For example, the computing system can use the one or more inputs to generate one or more expressions (e.g., one or more query language expressions) that can be used as the basis of the security policy. For example, the one or more inputs can be used to generate and/or configure a security policy that will apply to a group of users provided via the one or more inputs.

In some embodiments, the security request can be associated with one or more constraints on authentication, access, and/or authorization of one or more applications or one or more devices associated with the organizational data. For example, the one or more constraints can include a user to access an application from a particular location (e.g., from within an organizational office).

In some embodiments, the security request can be associated with a request authorization level. Further, the one or more policies can be respectively associated with one or more policy authorization levels. For example, a rule can comply with a policy when the request authorization level associated with the rule is greater than the one or more policy authorization levels.

In some embodiments, the organizational data can include historical data that is associated with one or more events in which one or more applications associated with the organizational data were accessed. For example, the historical data can include a log of the one or more events including when the one or more applications were accessed and/or by whom the one or more applications were accessed.

The one or more organizational records can respectively include one or more user attributes. Further, the security policy can be based at least in part on one or more rules associated with the historical data and the one or more user attributes. For example, the one or more user attributes can include a unique user identifier. The unique user identifier can be associated with access events at certain times of day from certain locations that can be used to establish an access pattern that can be used to detect unauthorized access attempts that do not sufficiently conform to the access pattern.

In some embodiments, the organizational data can include information associated with one or more geographic areas. Further, the one or more rules can be associated with constraining access to one or more applications or one or more devices based at least in part on the one or more geographic areas. For example, the organizational data can include the geographic location at which a user is employed and the one or more rules can constrain access to a device within that geographic location.

In some embodiments, the one or more organizational records can include one or more employee records respectively associated with one or more employees of an organization. For example, the one or more employee records can include one or more names, one or more statuses (of the one or more employees), one or more groups (e.g., groups with which the one or more employee records are associated), and/or one or more unique identifiers (e.g., a unique number to respectively identify each of the one or more employee records).

In some embodiments, the one or more rules can include one or more session time-out rules to limit a duration of an authentication session of one or more applications associated with the one or more organizational records. For example, the one or more session time-out rules can terminate an authentication session after thirty (30) seconds.

In some embodiments, the one or more rules can include one or more multi-factor authentication rules granting access to one or more applications associated with the organizational data based at least in part on the use of a plurality of authentication modalities. For example, the one or more rules can request that a user use a combination of a passcode and a biometric identifier (e.g., fingerprint or facial scan) to obtain access to an application.

In some embodiments, the one or more rules can include one or more passcode complexity criteria associated with the one or more organizational records. Further, the one or more passcode complexity criteria can include a minimum passcode length. For example, the one or rules can include a rule that a passcode is at least eight (8) characters long and includes at least one capital letter and a punctuation mark.

In some embodiments, the security policy can be associated with regulating access to one or more applications or one or more devices associated with the organizational data. For example, the security policy can restrict access to certain applications based on group or division associated with a user.

The disclosed technology can include a computing system and/or computing device that is configured to perform various operations associated with the generation and/or implementation of one or more security policies. In some embodiments, the user computing system can be associated with various computing systems and/or devices that use, send, receive, and/or generate information and/or data associated with the generation and/or implementation of one or more security policies. Furthermore, the user computing system can process, generate, modify, and/or access (e.g., send and/or receive) data and/or information including data and/or information associated with one or more rules, one or more policies, organizational data, and/or one or more organizational records.

In some implementations, the disclosed computing system can be operated from a server computing system that may be accessed by a user via one or more computing devices that are connected to the server computing system. Further, the disclosed computing system can be configured to access organizational records that may be stored locally or at remote locations that are accessible via a communications network (e.g., a Local Area Network (LAN) and/or the Internet).

The computing device can include specialized hardware and/or software that enable the performance of one or more operations specific to the disclosed technology. The user computing system can include one or more application specific integrated circuits that are configured to perform operations associated with the generation and/or implementation of one or more security policies.

The systems, methods, devices, apparatuses, and tangible non-transitory computer-readable media in the disclosed technology can provide a variety of technical effects and benefits including an improvement in the generation and implementation of security policies. In particular, the disclosed technology may assist a user (e.g. an administrator of a security policy) in performing a technical task by means of a continued and/or guided human-machine interaction process in which the user can interact with a user interface that can be used to generate and/or configure a security policy that can be used to regulate access, authentication, and/or authorization with respect to computing devices, applications, and/or organizational data that includes organizational records associated with an organization. Furthermore, the disclosed technology may also provide benefits including improvements in computing resource usage efficiency, security, and ease of use.

The disclosed technology can provide a variety of technical effects and benefits with respect to the efficiency of computing resource usage by reducing the number of different queries that need to be made to implement a security policy. By using organizational data as a basis for generating a security policy, the disclosed technology can access a centralized source of information that can be used to develop a more complete indication of the users, applications, and/or devices to which the security policy will apply. In this way, a piece-meal approach in which different sets of users, applications, and/or devices are individually accessed can be reduced and/or avoided, thereby reducing the amount of burdensome work and resulting in better coverage of the users, applications, and/or devices associated with an organization.

Furthermore, the disclosed technology can be used in the generation of security policies that can be readily applied to organizations that include large groups of users and their associated computing devices, applications, and associated organizational data. By implementing security policies that can apply rules and conditions to users and computing resources associated with those users, the disclosed technology can result in more coherent and consistent security policies that can reduce the downtime and errors that may result from less coherent and inconsistent security policies or not security policy at all.

Furthermore, the disclosed technology provides a greater level of security through the generation of customized security policies. By facilitating the ease with which a security policy can be generated and/or configured, the disclosed technology allows for more tailor made security policies that can cover a greater number of use cases in a shorter amount of time and with greater precision than a one-size fits all approach in which overarching security policies that may be too restrictive for some users and too lax for other users are implemented. Additionally, the disclosed technology is highly configurable and can use information in organizational data to generate security policies that can be in accordance with the structure of the underlying organization.

As such, the disclosed technology may assist a user in more effectively performing a variety of security policy oriented tasks by providing the specific benefits of improved ease of use; greater security for applications, computing devices, and data; and greater configurability of security policies. Further, any of the specific benefits provided to users can be used to improve the effectiveness of a wide variety of devices and services including any devices or services that rely on the disclosed technology. Accordingly, the improvements offered by the disclosed technology can result in tangible benefits to a variety of applications, devices, and/or systems including mechanical, electronic, and computing systems associated with the generation and implementation of security policies.

With reference to the Figures, example embodiments of the present disclosure will be discussed in further detail.

FIG. 1 depicts a block diagram of an example environment including a computing system that performs operations according to example embodiments of the present disclosure. The environment 100 includes a network 102, a computing system 110, one or more computing devices 112, one or more processors 114, one or more memory devices 116, data 118, instructions 120, a remote computing system 130, one or more computing devices 132, one or more processors 134, one or more memory devices 136, data 138, instructions 140, one or more computing devices 152, one or more processors 154, one or more memory devices 156, data 158, and instructions 160.

The network 102 can include any type of communications network. For example, the network 102 can include a local area network (LAN), a wide area network (WAN), an intranet, an extranet, and/or the Internet. Further, the network 102 can include any number of wired or wireless connections and/or links that can be used to communicate with one or more systems (e.g., the computing system 110 and/or the remote computing system 130) and/or one or more devices (e.g., the one or more computing devices 152). Communication over the network 102 can be performed via any type of wired and/or wireless connection and can use a wide variety of communication protocols (e.g., TCP/IP, HTTP, SMTP, FTP), encodings or formats (e.g., HTML, XML), and/or protection schemes (e.g., VPN, secure HTTP, SSL).

The computing system 110 can include any combination of systems and/or devices including one or more computing systems and/or one or more computing devices. Further, the computing system 110 may be connected (e.g., networked) to one or more computing systems and/or one or more computing devices via the network 102. The computing system 110 may operate in various different configurations including as a server or a client machine in client-server network environment, or as a peer machine in a peer-to-peer (or distributed) network environment. Though the computing system 110 is depicted in FIG. 1 as a single device, the computing system 110 can include any collection or combination of devices that individually or in combination with other devices, execute a set of one or more instructions to perform any one or more of the operations discussed herein.

In this example, the computing system 110 includes the one or more computing devices 112. The one or more computing devices 112 can include any type of computing device. For example, the one or more computing devices 112 can include a personal computing device (e.g., a desktop computing device), a mobile computing device (e.g., a smartphone or tablet), a wearable computing device (e.g., a smartwatch), an embedded computing device, a web appliance, a server, a network router, a switch, a bridge, or any device capable of executing a set of instructions (e.g., any combination of instructions which can include sequential instructions and/or parallel instructions) associated with one or more operations and/or one or more actions to be performed by the computing system 110 or any of the constituent components and/or devices of the computing system 110.

Any of the one or more computing devices 112 can include the one or more processors 114. The one or more processors 114 can be include any processing device (e.g., a processor core, a microprocessor, an ASIC, a FPGA, a controller, or a microcontroller) and can include one processor or a plurality of processors that may be operatively connected. In some embodiments, the one or more processors 114 may include one or more complex instruction set computing (CISC) microprocessors, one or more reduced instruction set computing (RISC) microprocessors, one or more very long instruction word (VLIW) microprocessors, and/or one or more processors that are configured to implement other instruction sets.

The one or more computing devices 112 can include the one or more memory devices 116. The one or more memory devices 116 can be used to store data and/or information and can include one or more computer-readable media, one or more non-transitory computer-readable storage media, and/or one or more machine-readable media. Though the one or more memory devices 116 are depicted in FIG. 1 as a single unit (e.g., a single medium), the computer-readable storage media can include a single medium or multiple media (e.g., a centralized or distributed database, and/or associated caches and servers) that store one or more sets of instructions. Further, the computer-readable storage media can include any medium that is capable of storing, encoding, and/or carrying a set of instructions for execution by a computing device and which may cause the computing device to perform any of the one or more operations described herein. In some embodiments, the computer-readable storage media can include one or more solid-state memories, one or more optical media, and/or one or more magnetic media. By way of example, the one or more memory devices 116 can include any combination of random access memory (RAM), read only memory (ROM), EEPROM, EPROM, one or more flash memory devices, one or more magnetic storage devices (e.g., one or more hard disk drives).

The one or more processors 114 can be configured to execute one or more instructions to perform the operations described herein including for example, one or more operations associated with generating a security policy and implementing the security policy. Further, the one or more memory devices 116 can store the data 118 and/or the instructions 120, which can be executed by the one or more processors 114 to cause the one or more computing devices 112 to perform one or more operations.

The data 118 can include organizational data (e.g., organizational data including one or more organizational records), rule data (e.g., rule data that includes one or more rules used to configure a security policy), and/or policy data (e.g., policy data that includes one or policies associated with one or more applications, one or more devices, and/or data) are described herein. Further, the instructions 120 can include one or more instructions to use data including the data 118 to perform the one or more operations described herein. In some embodiments, the one or more memory devices 116 can be used to store one or more applications that can be operated by the one or more processors 114. The data 118, the instructions 120, and/or the one or more applications can be associated with an organization. Further, the computing system 110 may be associated with an organization and may be configured to manage the one or more applications. For example, the computing system 110 can perform one or more operations associated with authenticating one or more users that attempt to access the one or more applications and/or one or more extra-organizational applications that are remote from the computing system 110.

Any of the one or more computing devices 112 can include one or more input devices 122 and/or one or more output devices 124. The one or more input devices 122 can be configured to receive input (e.g., user input) and can include one or more touch screens, one or more keyboards, one or more pointing devices, (e.g., mouse device), one or more buttons, one or more microphones, and/or one or more cameras. The one or more output devices 124 can include one or more display devices, one or more loudspeaker devices, one or more haptic output devices. By way of example, the one or more output devices 124 can be used to display a graphical user interface via a display device that can include a touch screen layer that is configured to detect one or more user inputs.

The remote computing system 130 includes the one or more computing devices 132. Each of the one or more computing devices 132 can include one or more processors 134, one or more memory devices 136, the data 138, and/or the instructions 140. The remote computing system 130 can include any of the attributes and/or capabilities of the computing system 110. Further, the remote computing system 130 can communicate with one or more devices and/or one or more systems via the network 102.

In some embodiments, the remote computing system 130 can include one or more applications (e.g., computing software applications) that can be stored and/or executed by the remote computing system 130. Further, the one or more applications can include one or more extra-organizational applications that may be accessed from the computing system 110 and which are at least partly operated from the remote computing system 130. The one or more extra-organizational applications can be associated with an organization that is different from the organization that is associated with the computing system 110 (e.g., the extra-organizational applications can include one or more third-party applications). Further, the data 138 can include one or more portions of the organizational data, rules data, and/or policy data.

Figure 2:
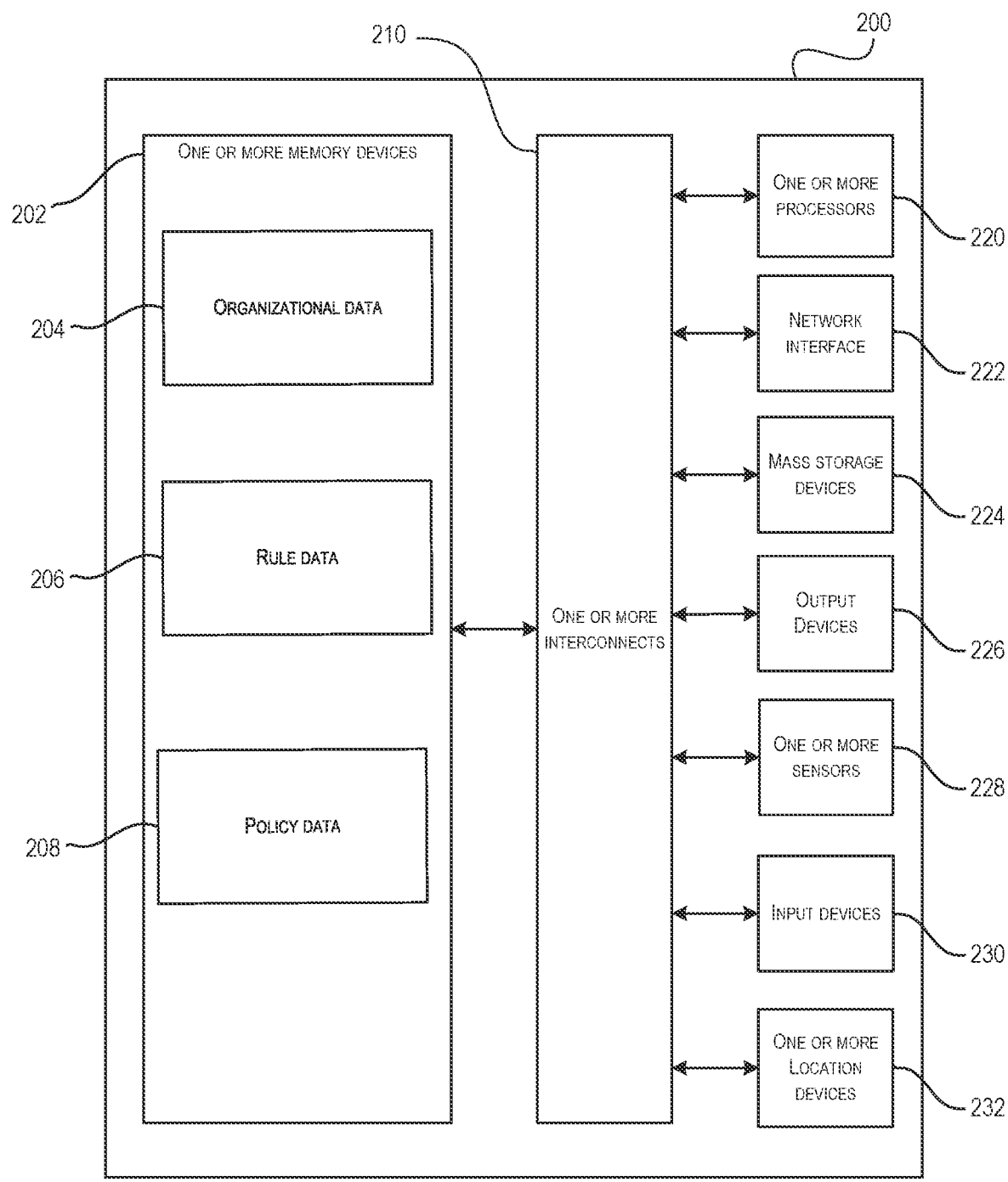
FIG. 2 depicts a block diagram of an example of a computing device according to example embodiments of the present disclosure.

FIG. 2 depicts a block diagram of an example computing device according to example embodiments of the present disclosure. A computing device 200 can include one or more attributes and/or capabilities of the computing system 110, the remote computing system 130, the one or more computing devices 152, and/or the computing device 200. Furthermore, the computing device 200 can be configured to perform one or more operations and/or one or more actions that can be performed by the computing system 110, the remote computing system 130, the one or more computing devices 152, and/or the computing device 200.

As shown in FIG. 2, the computing device 200 can include one or more memory devices 202, organizational data 204, rule data 206, policy data 208, one or more interconnects 210, one or more processors 220, a network interface 222, one or more mass storage devices 224, one or more output devices 226, one or more sensors 228, one or more input devices 230, and/or the location device 232.

The one or more memory devices 202 can store information and/or data (e.g., the organizational data 204, the rule data 206, and/or the policy data 208). Further, the one or more memory devices 202 can include one or more non-transitory computer-readable storage media, including RAM, ROM, EEPROM, EPROM, flash memory devices, magnetic disks, and combinations thereof. The information and/or data stored by the one or more memory devices 202 can be executed by the one or more processors 220 to cause the computing device 200 to perform operations including one or more operations associated with accessing a security request, determining whether one or more rules are in compliance with one or more policies, generating a security policy, and performing one or more operations associated with implementing the security policy.

The organizational data 204 can include one or more portions of data (e.g., the data 118, the data 138, and/or the data 158, which are depicted in FIG. 1) and/or instructions (e.g., the instructions 120, the instructions 140, and/or the instructions 160 which are depicted in FIG. 1) that are stored in the one or more memory devices 116, the one or more memory devices 136, and/or the one or more memory devices 156, respectively. Furthermore, the organizational data 204 can include information associated with one or more organizational records. In some embodiments, the organizational data 204 can be received from one or more computing systems (e.g., the remote computing system 130 depicted in FIG. 1) which can include one or more computing systems that are remote (e.g., in another room, building, part of town, city, or nation) from the computing device 200.

The rule data 206 can include one or more portions of data (e.g., the data 118, the data 138, and/or the data 158, which are depicted in FIG. 1) and/or instructions (e.g., the instructions 120, the instructions 140, and/or the instructions 160 which are depicted in FIG. 1) that are stored in the one or more memory devices 116, the one or more memory devices 136, and/or the one or more memory devices 156, respectively. Furthermore, the rule data 206 can include information associated with one or more rules that can be used to generate and/or implement a security policy. In some embodiments, the rule data 206 can be received from one or more computing systems (e.g., the remote computing system 130 depicted in FIG. 1) which can include one or more computing systems that are remote from the computing device 200.

The policy data 208 can include one or more portions of data (e.g., the data 118, the data 138, and/or the data 158, which are depicted in FIG. 1) and/or instructions (e.g., the instructions 120, the instructions 140, and/or the instructions 160 which are depicted in FIG. 1) that are stored in the one or more memory devices 116, the one or more memory devices 136, and/or the one or more memory devices 156, respectively. Furthermore, the policy data 208 can include information associated with one or more policies that are used to regulate one or more applications, one or more computing devices, and/or one or more records which can include one or more organizational records. In some embodiments, the policy data 208 can be received from one or more computing systems (e.g., the remote computing system 130 depicted in FIG. 1) which can include one or more computing systems that are remote from the computing device 200.

The one or more interconnects 210 can include one or more interconnects or buses that can be used to send and/or receive one or more signals (e.g., electronic signals) and/or data (e.g., the organizational data 204, the rule data 206, and/or the policy data 208) between components of the computing device 200, including the one or more memory devices 202, the one or more processors 220, the network interface 222, the one or more mass storage devices 224, the one or more output devices 226, the one or more sensors 228 (e.g., a sensor array), the one or more input devices 230, and/or the location device 232. The one or more interconnects 210 can be arranged or configured in different ways. For example, the one or more interconnects 210 can be configured as parallel or serial connections. Further the one or more interconnects 210 can include: one or more internal buses that are used to connect the internal components of the computing device 200; and one or more external buses used to connect the internal components of the computing device 200 to one or more external devices. By way of example, the one or more interconnects 210 can include different interfaces including Industry Standard Architecture (ISA), Extended ISA, Peripheral Components Interconnect (PCI), PCI Express, Serial AT Attachment (SATA), HyperTransport (HT), USB (Universal Serial Bus), Thunderbolt, IEEE 1394 interface (FireWire), and/or other interfaces that can be used to connect components.

The one or more processors 220 can include one or more computer processors that are configured to execute the one or more instructions stored in the one or more memory devices 202. For example, the one or more processors 220 can, for example, include one or more general purpose central processing units (CPUs), application specific integrated circuits (ASICs), and/or one or more graphics processing units (GPUs). Further, the one or more processors 220 can perform one or more actions and/or operations including one or more actions and/or operations associated with the organizational data 204, the rule data 206, and/or the policy data 208. The one or more processors 220 can include single or multiple core devices including a microprocessor, microcontroller, integrated circuit, and/or a logic device.

The network interface 222 can support network communications. The network interface 222 can support communication via networks including a local area network and/or a wide area network (e.g., the Internet). For example, the network interface 222 can allow the computing device 200 to communicate with the computing system 110 via the network 102.

The one or more mass storage devices 224 (e.g., a hard disk drive and/or a solid state drive) can be used to store data including the organizational data 204, the rule data 206, and/or the policy data 208. The one or more output devices 226 can include one or more display devices (e.g., LCD display, OLED display, Mini-LED display, microLED display, plasma display, and/or CRT display), one or more light sources (e.g., LEDs), one or more loudspeakers, and/or one or more haptic output devices (e.g., one or more devices that are configured to generate vibratory output).

The one or more sensors 228 can be configured to detect various states and can include one or more cameras, one or more light detection and ranging (LiDAR) devices, one or more sonar devices, and/or one or more radar devices. Further, the one or more sensors 228 can be used to provide input (e.g., an image of a user captured using the one or more cameras) that can be used as part of a security policy. For example, the one or more sensors 228 can be used to authenticate the identity of a user based on an image of the user's face that is captured using the one or more sensors 228.

The one or more input devices 230 can include one or more touch sensitive devices (e.g., a touch screen display), a mouse, a stylus, one or more keyboards, one or more buttons (e.g., ON/OFF buttons and/or YES/NO buttons), one or more microphones, and/or one or more cameras (e.g., cameras that are used to detect gestures that can trigger one or more operations by the computing device 200).

Although the one or more memory devices 202 and the one or more mass storage devices 224 are depicted separately in FIG. 2, the one or more memory devices 202 and the one or more mass storage devices 224 can be regions within the same memory module. The computing device 200 can include one or more additional processors, memory devices, network interfaces, which may be provided separately or on the same chip or board. The one or more memory devices 202 and the one or more mass storage devices 224 can include one or more computer-readable media, including, but not limited to, non-transitory computer-readable media, RAM, ROM, hard drives, flash drives, and/or other memory devices.

The one or more memory devices 202 can store sets of instructions for applications including an operating system that can be associated with various software applications or data. For example, the one or more memory devices 202 can store sets of instructions for one or more applications that are subject to one or more security policies that can be generated and/or implemented by the computing device 200 and/or one or more other computing devices or one or more computing systems. In some embodiments, the one or more memory devices 202 can be used to operate or execute a general-purpose operating system that operates on mobile computing devices and/or and stationary devices, including for example, smartphones, laptop computing devices, tablet computing devices, and/or desktop computers.

The software applications that can be operated or executed by the computing device 200 can include applications associated with the computing system 110, the remote computing system 130, and/or the one or more computing devices 152 that are depicted in FIG. 1. Further, the software applications that can be operated and/or executed by the computing device 200 can include native applications, web services, and/or web-based applications.

The location device 232 can include one or more devices or circuitry for determining the position of the computing device 200. For example, the location device 232 can determine an actual and/or relative position of the computing device 200 by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or Wi-Fi hotspots, and/or beacons.

Figure 3:
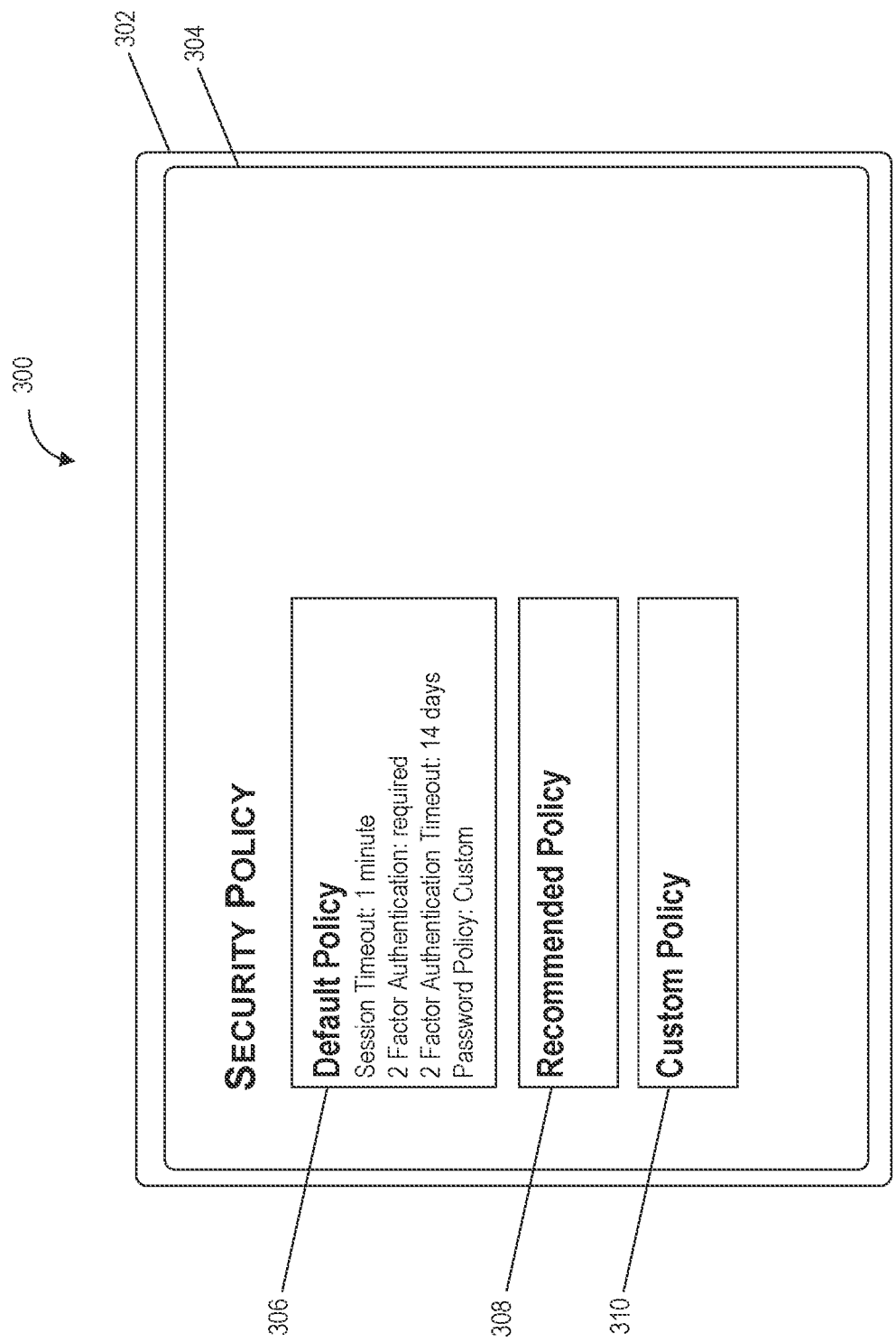
FIG. 3 depicts an example of a user interface for configuring a security policy according to example embodiments of the present disclosure.

FIG. 3 depicts an example of a user interface for configuring a security policy according to example embodiments of the present disclosure. A computing device 300 can include one or more attributes and/or capabilities of the computing system 110, the remote computing system 130, the one or more computing devices 152, and/or the computing device 200. Furthermore, the computing device 300 can be configured to perform one or more operations and/or one or more actions that can be performed by the computing system 110, the remote computing system 130, the one or more computing devices 152, and/or the computing device 200.

As shown in FIG. 3, the computing device 300 includes a display component 302, a user interface 304, an interface element 306, an interface element 308, and an interface element 310.

In this example, the computing device 300 is configured to generate output including a user interface 304 (e.g., a graphical user interface) that includes the interface element 306, the interface element 308, and the interface element 310 on the display component 302. The output of the computing device 300 is based at least in part on one or more security requests, one or more rules, one or more policies, and/or organizational data. Further, the output of the computing device 300 can be based at least in part on one or more organizational records that can be used to extract information that is used to determine the one or more applications and/or one or more computing devices that are associated with a user or that will be associated with the user.

The display component 302 can be configured to receive one or more inputs to cause the computing device 300 to perform one or more operations (e.g., operations associated with configuring and/or generating a security policy). For example, the display component 302 can be configured to receive touch inputs from a user to indicate the selection by the user of an interface element to the user interface 304. In some embodiments, the computing device 300 can receive other types of input including audio input (e.g., a user speaking a command to select an interface element), an external input device (e.g., a mouse device or keyboard), or a gesture (e.g., a gesture recognized by a camera of the computing device 300). In some embodiments, the computing device 300 can be configured to receive one or more inputs from one or more other computing devices (e.g., a laptop computer, a desktop computer, and/or a smartphone) that communicate with the computing device 300.

The user interface 304 includes the interface element 306, interface element 308 and interface element 310 which are associated with receiving an input to determine a security policy (e.g., an authentication policy). The interface element 306 indicates a default policy that includes a set of predetermined policy settings associated with the authentication policy for a user to access an application. For example, the interface element 306 can indicate that the default policy includes a session timeout of one (1) minute, a two-factor authentication requirement, a two-factor authentication timeout of fourteen (14) days, and that the default policy was customized based on either the user or a group (e.g., an organizational division) that the user belongs to.

The interface element 308 indicates a recommended policy that can be based at least in part on historical data associated with one or more previous events associated with generating the security policy. For example, the recommended policy can include a session timeout based at least in part on the duration of previous sessions by a set of users (e.g., other users of the same organization or organizational division as the user of the computing device 300). Further, the recommended policy associated with the interface element 308 can be based at least in part on the one or more applications that are associated with a user.

Figure 4:
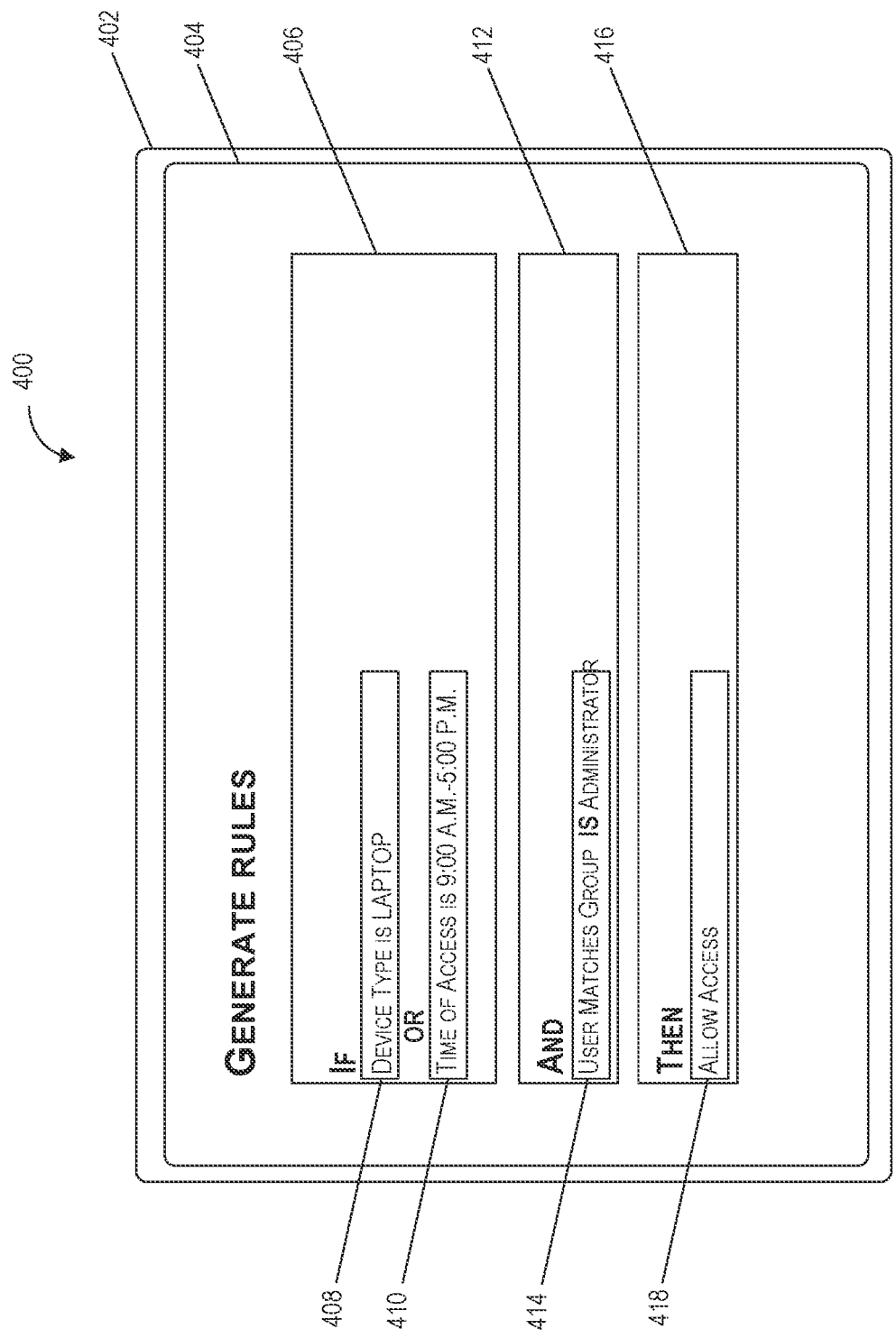
FIG. 4 depicts an example of a user interface for generating rules of a security policy according to example embodiments of the present disclosure.

The interface element 310 indicates a custom policy that can be configured based at least in part on one or more user inputs. For example, a user touching the interface element 310 can cause a set of user selectable rules to be displayed on the user interface 304 (e.g., the set of user selectable rules can include any portion of the user interface 404 that is depicted in FIG. 4). The user can then configure a security policy based at least in part on the user's preferences and/or selections. In some embodiments, the interface element 310 and the associated custom policy option may be displayed based at least in part on an access level associated with a user. For example, a user with a high access level may be presented with a wider range of options than a user with a low access level. Further, the user selectable rules associated with the custom policy option may be based at least in part on the identity of the user and/or the access level associated with the user.

FIG. 4 depicts an example of a user interface for generating rules of a security policy according to example embodiments of the present disclosure. A computing device 400 can include one or more attributes and/or capabilities of the computing system 110, the remote computing system 130, the one or more computing devices 152, and/or the computing device 200. Furthermore, the computing device 400 can be configured to perform one or more operations and/or one or more actions that can be performed by the computing system 110, the remote computing system 130, the one or more computing devices 152, and/or the computing device 200.

As shown in FIG. 4, the computing device 400 includes a display component 402, a user interface 404, an interface element 406, a field 408, a field 410, an interface element 412, a field 414, an interface element 416, and a field 418.

The computing device 400 can be configured to generate output including a user interface 404 (e.g., a graphical user interface) that includes the interface element 406, the interface element 412, and the interface element 416 on the display component 402. The output of the computing device 400 is based at least in part on one or more security requests, one or more rules, one or more policies, and/or organizational data. Further, the output of the computing device 400 can be based at least in part on one or more organizational records that can be used to extract information that is used to determine the one or more applications and/or one or more computing devices that are associated with a user or that will be associated with the user.

The display component 402 can be configured to receive one or more inputs to cause the computing device 400 to perform one or more operations (e.g., operations associated with a security policy). For example, the display component 402 can be configured to receive touch inputs from a user to indicate the selection by the user of an interface element to the user interface 404. In some embodiments, the computing device 400 can receive other types of input including audio input (e.g., a user speaking a command to select an interface element), an external input device (e.g., a mouse device or keyboard), or a gesture (e.g., a gesture recognized by a camera of the computing device 400). In some embodiments, the computing device 400 can be configured to receive one or more inputs from one or more other computing devices (e.g., a laptop computer, a desktop computer, and/or a smartphone) that communicate with the computing device 400.

The user interface 404 includes the interface element 406, the interface element 412, and the interface element 416 which are associated with receiving an input to generate one or more rules as part of the configuration of a security policy (e.g., an access policy). Further, the one or more interface elements associated with and/or displayed by the user interface 404 can be based at least in part on the user of the user interface 404. In this example, the available interface elements and/or fields can be based at least in part on a previous selection by a user to configure a security policy that includes rules directed to allowing access to some computing resource (e.g., computing device and/or application) based on device type, time of access, and/or group membership of the user.

Further, different users can be provided with different interface elements and/or different fields based at least in part on the user's identity and/or an authorization level associated with the user. For example, users may be provided with different interface elements and/or fields based at least in part on the authorization level associated with the user. Further, a user with a high authorization level may be provided with interface elements and/or fields that allow the user to configure a security policy for a greater number of groups of users and/or to access organizational data that is associated with another user.

Any of the interface element 406, interface element 412, and interface element 416 can include one or more fields (e.g., the field 408, the field 410, the field 414, and/or the field 418). The one or more fields can include information that is associated with one or more portions of the organizational data, the rule data, and/or one or the policy data.

The one or more fields can be associated with one or more operators that can include conditional operators and/or logical operators (e.g., IF, AND, OR, NOT). Further, each of the one or more fields can be associated with one or more field values. For example, the field 408 could alternatively be associated with the field value "APPLICATION TYPE IS E-MAIL" instead of the field value "DEVICE TYPE IS LAPTOP" that is in the field 408. In some embodiments, the field 408 can include multiple field values to indicate that the "IF" operator is associated with multiple fields. For example, the "IF" operator can be associated with the field values "DEVICE TYPE IS LAPTOP" "OR" the "TIME OF ACCESS IS 9:00 A.M.-5:00 P.M." to indicate that either field value being true will satisfy the condition. The one or more operators can be used to form one or more expressions and can be associated with one or more portions of the organizational data, the rule data, and/or one or more portions of the policy data.

The interface element 406 indicates an if rule that can be used to specify a first set of conditions that are part of the rule. For example, a user can select field values associated with the "IF" and/or "OR" operators from a list (e.g., select a field value from a drop down list) of field values or manually type in the field value (e.g., enter the field value via a pop-up keyboard displayed on the user interface 404 and/or a keyboard that is attached to the computing device 400). The rules can include a first condition associated with the field 408 that is based on the type of device (e.g., a mobile device) that will be used to access an application. Further, the rules can include a second condition associated with the field 410 that can be used in addition to the first condition or instead of the first rule, and which can be directed to the time during which access to an application is permitted (e.g., during regular nine (9) a.m. to five (5) p.m. business hours).

The interface element 412 is associated with a third condition that is added to the first condition and/or the second condition. For example, a user can select a field value associated with the "AND" operator from a list (e.g., select a field value from a drop down list) of field values or manually type in the field value (e.g., enter the field value via a pop-up keyboard displayed on the user interface 404 and/or a keyboard that is attached to the computing device 400). The rules can include a third condition associated with the field 414 that can be used to determine that the user associated with the rule is part of an administrator group. The administrator group may have access permissions that are not available to users that are in other groups with a lower authorization level.

In some embodiments, any of the field 408, the field 410, the field 414, and/or the field 418 can be configured to receive one or more query language expressions that can be used to generate and/or configure a security policy. For example, the interface element 406 can be configured to receive an expression indicating "IF DEVICE TYPE IS LAPTOP OR ACCESS TIME IS 9 AM TO 5 PM" the computing device could interpret the expression in the same way as the combination of the field 408 and the field 410.

The interface element 416 indicates an output or one or more operations that will result if all of the conditions of the rule are satisfied. In this example, the field 418 indicates that the rules will grant access to one or more computing devices and/or one or more applications when a combination of the third condition and any of the first condition or the second condition are satisfied.

Figure 5:
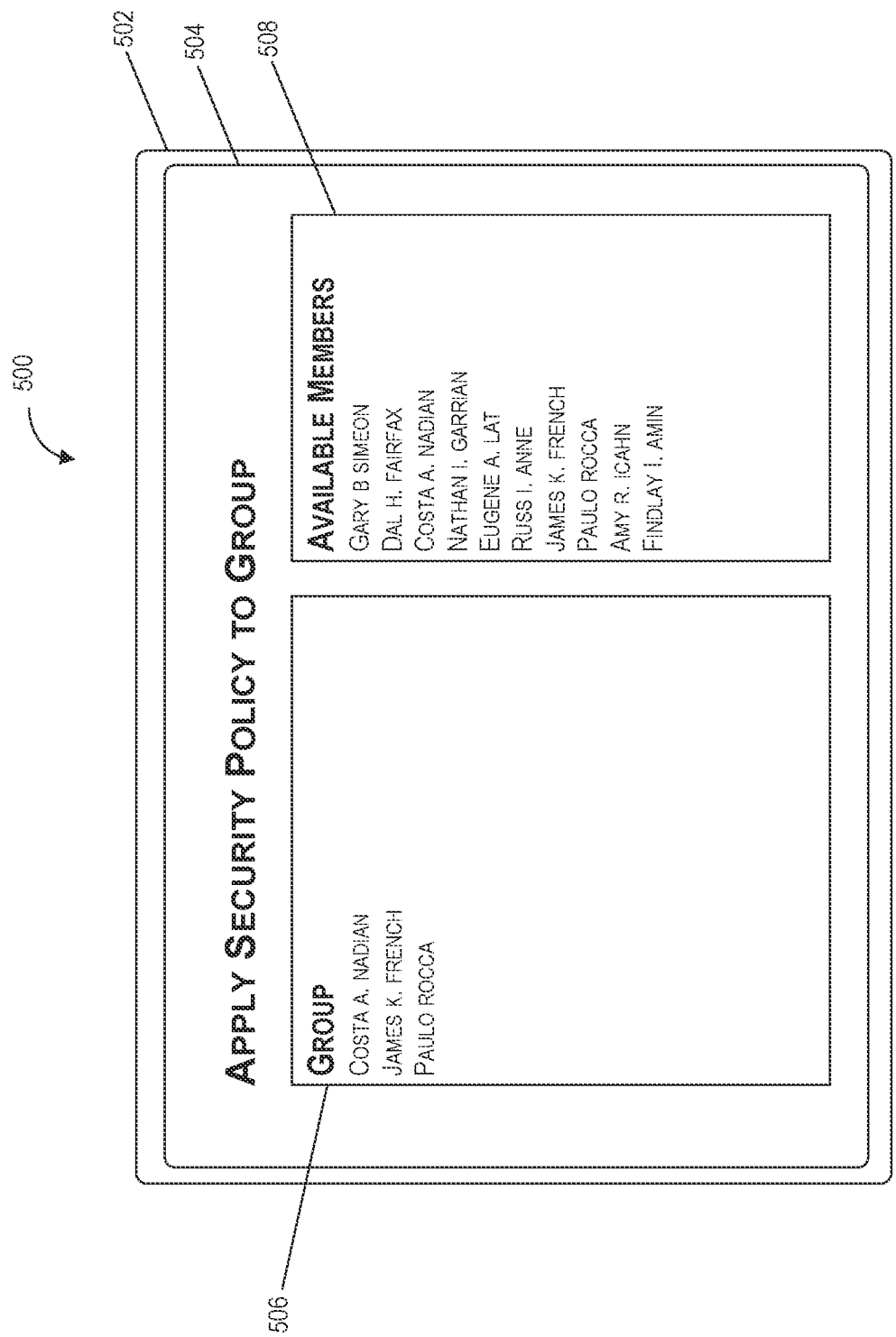
FIG. 5 depicts an example of a user interface for applying a security policy to a group according to example embodiments of the present disclosure.

FIG. 5 depicts an example of a user interface for applying a security policy to a group according to example embodiments of the present disclosure. A computing device 500 can include one or more attributes and/or capabilities of the computing system 110, the remote computing system 130, the one or more computing devices 152, and/or the computing device 200. Furthermore, the computing device 500 can be configured to perform one or more operations and/or one or more actions that can be performed by the computing system 110, the remote computing system 150, the one or more computing devices 152, and/or the computing device 200.

As shown in FIG. 5, the computing device 500 includes a display component 502, a user interface 504, an interface element 506, an interface element 508, and an interface element 510.

In this example, the computing device 500 is configured to generate output including a user interface 504 (e.g., a graphical user interface) that includes the interface element 506 and the interface element 508, which are displayed on the display component 502. The output of the computing device 500 is based at least in part on one or more of a security request, one or more rules, one or more policies, and/or organizational data. Further, the output of the computing device 500 can be based at least in part on one or more organizational records that are used to extract information that is used to determine the one or more applications and/or one or more computing devices that are associated with a user or that will be associated with the user.

The display component 502 can be configured to receive one or more inputs to cause the computing device 500 to perform one or more operations (e.g., operations associated with a security policy). For example, the display component 502 can be configured to receive touch inputs from a user to indicate the selection by the user of an interface element to the user interface 504. In some embodiments, the computing device 500 can receive other types of input including audio input (e.g., a user speaking a command to select an interface element), an external input device (e.g., a mouse device or keyboard), or a gesture (e.g., a gesture recognized by a camera of the computing device 500). In some embodiments, the computing device 500 can be configured to receive one or more inputs from one or more other computing devices (e.g., a laptop computer, a desktop computer, and/or a smartphone) that communicate with the computing device 500.

The user interface 504 includes the interface element 506 and the interface element 508, which are associated with receiving an input to add and/or remove one or more members of an organization from a group. The interface element 506 can be associated with a group that will be subject to one or more security policies. A group can for example, be a group that is associated with a division, team, or department of an organization. The interface element 508 can be associated with a set of available members of an organization that are available to be added to the group associated with the interface element 506. Further, a group may be associated with one or more security policies. For example, a particular set of security policies will be applied to the members associated with the interface element 506.

The interface element 506 indicates membership in a group associated with the interface element 506 and includes members that have been selected from a list of available members indicated in the interface element 508. A user could, for example, select and drag a member from the interface element 508 and drop the selected member in the interface element 506 to indicate that the security policy will apply to the members associated with the interface element 506. By way of further example, a user could select and drag a member from the interface element 506 and drop the selected member outside of the interface element 506 to indicate that the security policy will not apply to the member that was dragged and dropped outside the interface element 506.

Figure 6:
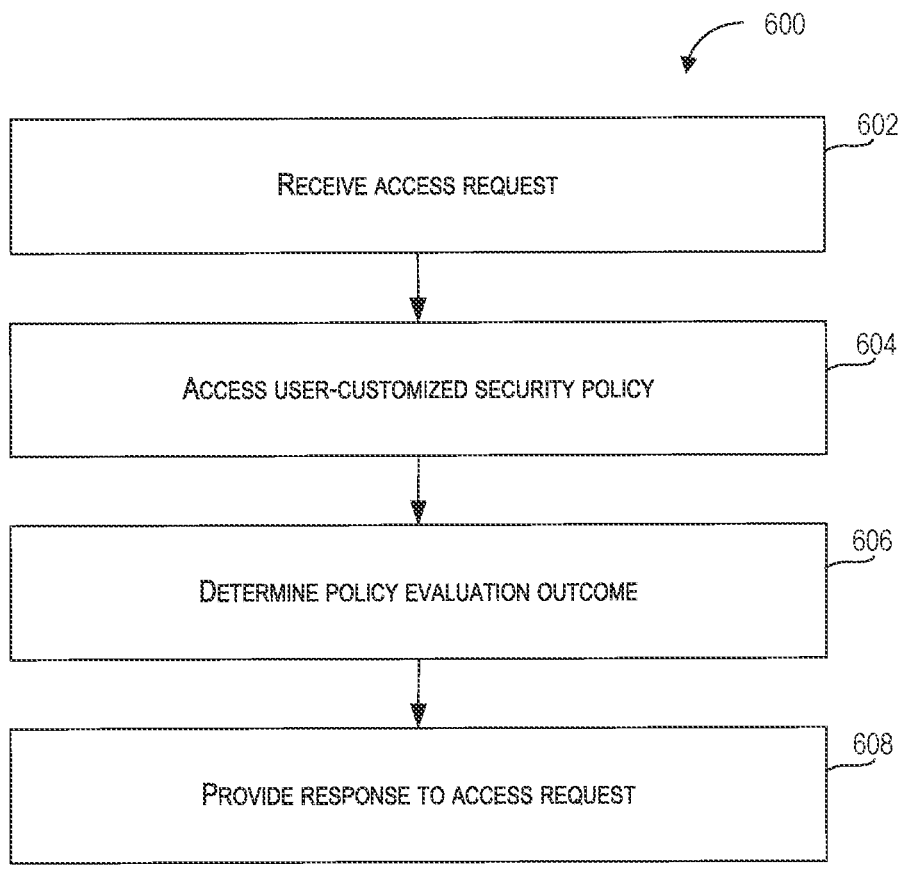
FIG. 6 depicts a flow diagram of generating and implementing security policies according to example embodiments of the present disclosure.

FIG. 6 depicts a flow diagram of generating and implementing security policies according to example embodiments of the present disclosure. One or more portions of the method 600 can be executed and/or implemented on one or more computing devices or computing systems including, for example, the computing system 110, the remote computing system 130, the one or more computing devices 152, and/or the computing device 200. Further, one or more portions of the method 600 can be executed or implemented as an algorithm on the hardware devices or systems disclosed herein. FIG. 6 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 602, the method 600 can include receiving an access request associated with a particular employee and a particular computing resource. For example, the computing system 110, can be associated with an organization and can receive an access request. The access request can include information associated with the name of an employee of the organization and a request for the employee to use a particular computing resource of the organization (e.g., a laptop computing device and/or software application).

At 604, the method 600 can include accessing a user-customized security policy associated with the particular employee or the particular computing resource. The user-customized security policy can be defined using one or more references to a set of organizational data that includes employee data records for employees of an organization. For example, the computing system 110 can access a user-customized security policy that defines the user-customized security policy based on references to employee data records including a name or unique identifier of each employee and any computing resources that are assigned to each employee by the organization (e.g., computing devices and/or software applications that are assigned to the employee by the organization).

At 606, the method 600 can include determining, by the computing system, a policy evaluation outcome based at least in part on a comparison of the one or more references to the set of organizational data with an employee data record associated with the particular employee. For example, the computing system 110 can compare the employee record of the particular employee to the one or more references to the computing resources that the particular employee is permitted to access. If the employee is permitted to access that particular resource then the policy evaluation outcome will be positive. If the employee is not permitted to access that particular resource then the policy evaluation outcome will be negative.

At 608, the method 600 can include providing, by the computing system, a response to the access request based at least in part on the policy evaluation outcome. For example, if the policy evaluation outcome is positive, the computing system 110 can provide a response indicating that the particular employee is permitted to access the particular computing resource. However, if the policy evaluation outcome is negative, the computing system 110 can provide a response indicating that the particular employee is not permitted to access the particular computing resource.

Figure 7:
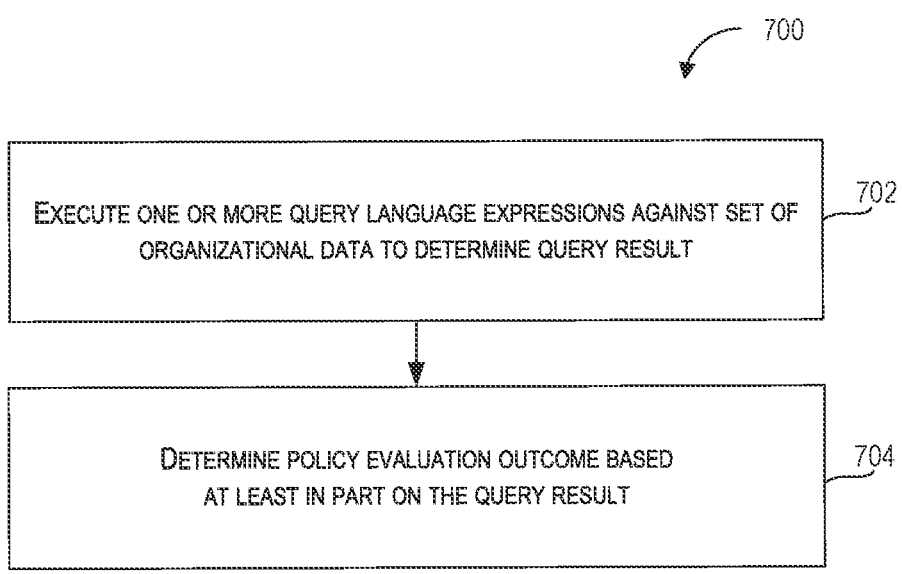
FIG. 7 depicts a flow diagram of generating and implementing security policies according to example embodiments of the present disclosure.

FIG. 7 depicts a flow diagram of generating and implementing security policies according to example embodiments of the present disclosure. One or more portions of the method 700 can be executed and/or implemented on one or more computing devices or computing systems including, for example, the computing system 110, the remote computing system 130, the one or more computing devices 152, and/or the computing device 200. Further, one or more portions of the method 700 can be executed or implemented as an algorithm on the hardware devices or systems disclosed herein. FIG. 7 depicts steps performed in a particular order for purposes of illustration and discussion. In some embodiments, one or more portions of the method 700 can be performed as part of the method 600 that is depicted in FIG. 6. Those of ordinary skill in the art, using the disclosures provided herein, will understand that various steps of any of the methods disclosed herein can be adapted, modified, rearranged, omitted, and/or expanded without deviating from the scope of the present disclosure.

At 702, the method 700 can include executing one or more query language expressions against the set of organizational data to determine a query result. In some embodiments, determining the policy evaluation outcome can include executing the one or more query language expressions against the set of organizational data to determine the query result. For example, the computing system 110 can execute the one or more query language expressions against the set of organizational data in order to generate a query result that indicates whether one or more references to the set of organizational data are associated with and/or in compliance with the employee data record associated with a particular employee. For example, the query result can indicate "true" if the one or more references to the set of organizational data are associated with the employee data record associated with a particular employee. Further, the query result can indicate "false" if the one or more references to the set of organizational data are not associated with the employee data record associated with a particular employee.

At 704, the method 700 can include determining the policy evaluation outcome based at least in part on the query result. For example, the computing system 110 can, if the query result indicates "true," the policy evaluation outcome can also reflect the query result and provide a positive response to the access request (e.g., indicate that the particular employee is permitted to access the particular computing resource). However, if the computing system 110 determines that the query result indicates "false," the policy evaluation outcome can reflect the query result and provide a negative response to the access request (e.g., indicate that the particular employee is not permitted to access the particular computing resource).

Figure 8:
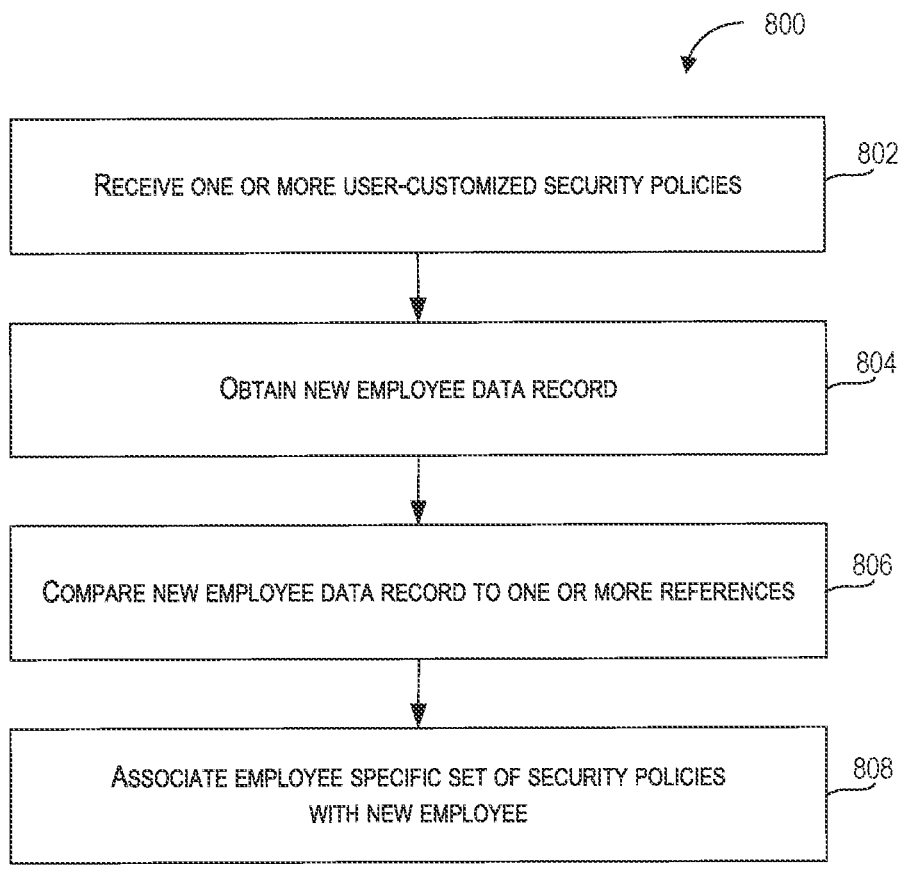
FIG. 8 depicts a flow diagram of generating and implementing security policies according to example embodiments of the present disclosure.

FIG. 8 depicts a flow diagram of generating and implementing security policies according to example embodiments of the present disclosure. One or more portions of the method 800 can be executed and/or implemented on one or more computing devices or computing systems including, for example, the computing system 110, the remote computing system 130, the one or more computing devices 152, and/or the computing device 200. Further, one or more portions of the method 800 can be executed or implemented as an algorithm on the hardware devices or systems disclosed herein. FIG. 8 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 802, the method 800 can include receiving one or more user-customized security policies. Each security policy can be defined using one or more references to a set of organizational data that includes employee data records for employees of an organization. For example, the computing system 110 can access one or more user-customized security policy that define each of the user-customized security policies by using references to employee data records that include information including a name or unique identifier of each employee and any computing resources that are assigned to each employee by the organization (e.g., computing devices and/or software applications that are assigned to the employee by the organization).

At 804, the method 800 can include obtaining a new employee data record associated with a new employee of the organization. For example, the computing system 110 can access the new employee data record that include information associated with the new employee of the organization. The new employee record can include the name of the new employee, a unique identifier associated with the name of the new employee, and an indication of the computing resources the new employee is permitted to access.

At 806, the method 800 can include comparing the new employee data record with the one or more references to the set of organizational data included in each of the one or more user-customized security policies to determine an employee-specific set of security policies from the one or more user-customized security policies that apply to the new employee. For example, the computing system 110 can compare the new employee data record with the one or more references to the set of organizational data to determine the employee-specific set of security policies that apply to the new employee (e.g., security policies that apply to the new employee and not to other employees that are not new employees). By way of example, the employee-specific set of security policies can include one or more policies that limit the new employee's access to organizational records that are outside the new employee's organizational department.

At 808, the method 800 can include associating the employee-specific set of security policies with the new employee. For example, based at least in part on the determination of the employee-specific set of security policies, the computing system 110 can associate the new employee with the employee-specific set of security policies that limit the new employee's access to organizational records outside the new employee's organizational department.

Figure 9:
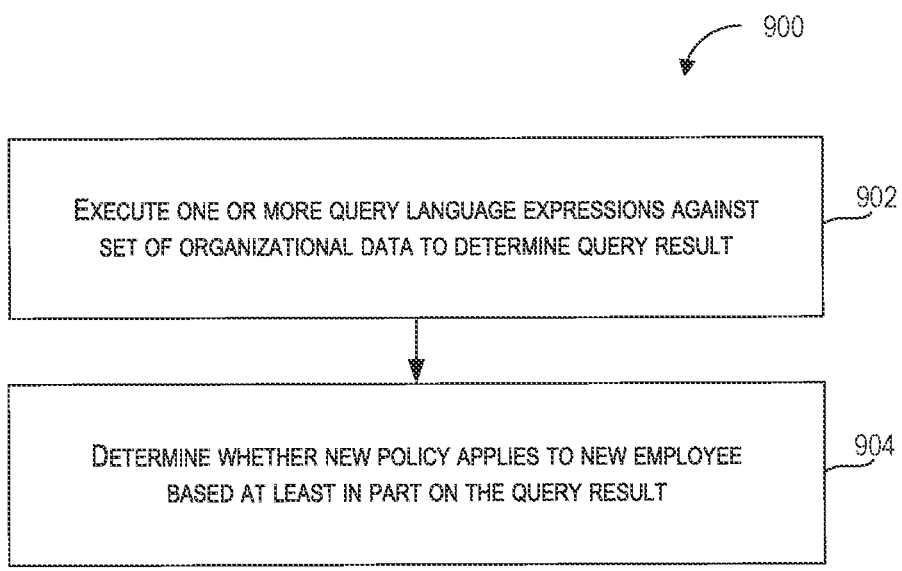
FIG. 9 depicts a flow diagram of generating and implementing security policies according to example embodiments of the present disclosure.

FIG. 9 depicts a flow diagram of generating and implementing security policies according to example embodiments of the present disclosure. One or more portions of the method 900 can be executed and/or implemented on one or more computing devices or computing systems including, for example, the computing system 110, the remote computing system 130, the one or more computing devices 152, and/or the computing device 200. Further, one or more portions of the method 900 can be executed or implemented as an algorithm on the hardware devices or systems disclosed herein. FIG. 9 depicts steps performed in a particular order for purposes of illustration and discussion. In some embodiments, one or more portions of the method 900 can be performed as part of the method 800 that is depicted in FIG. 8. Those of ordinary skill in the art, using the disclosures provided herein, will understand that various steps of any of the methods disclosed herein can be adapted, modified, rearranged, omitted, and/or expanded without deviating from the scope of the present disclosure.

At 902, the method 900 can include executing one or more query language expressions against the set of organizational data to determine a query result. In some embodiments, comparing the new employee data record to the one or more references to the set of organizational data included in each of the one or more user-customized security policies can include executing the one or more query language expressions against the set of organizational data to determine the query result. For example, the computing system 110 can execute the one or more query language expressions against the set of organizational data in order to generate a query result that indicates whether the one or more references to the set of organizational data are associated with and/or in compliance with the employee data record associated with a new employee. For example, the query result can indicate "true" if the one or more references to the set of organizational data are associated with the employee data record associated with the new employee. Further, the query result can indicate "false" if the one or more references to the set of organizational data are not associated with the employee data record associated with the new employee.

At 904, the method 900 can include determining whether the policy applies to the new employee based at least in part on the query result. For example, the computing system 110 can, if the query result indicates "true," provide a positive response that indicates that the user-customized security policy applies to the new employee. However, if the computing system 110 determines that the query result indicates "false," the computing system 110 can provide a negative that indicates that the user-customized security policy does not apply to the new employee.

Figure 10:
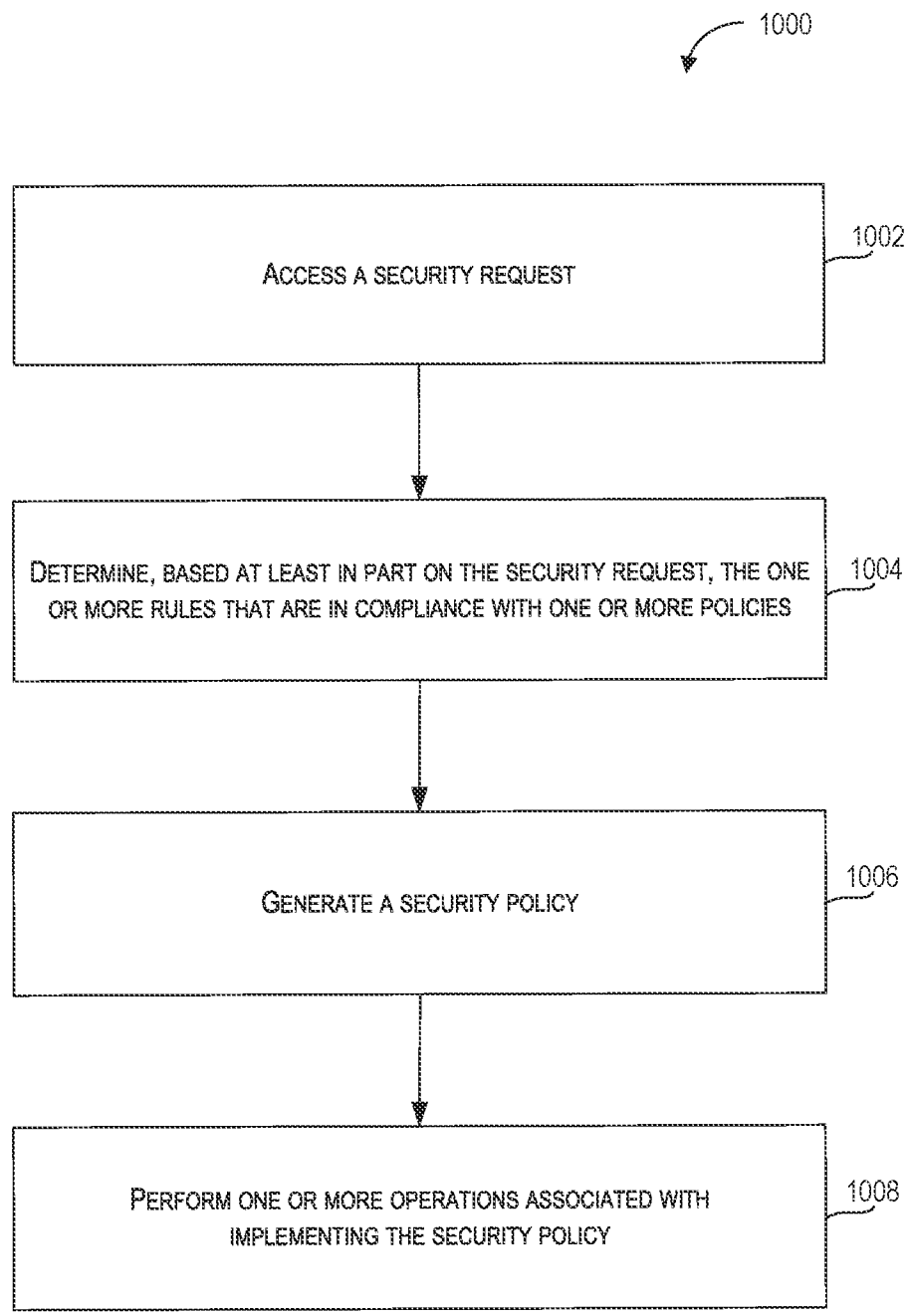
FIG. 10 depicts a flow diagram of generating and implementing security policies according to example embodiments of the present disclosure.

FIG. 10 depicts a flow diagram of generating and implementing security policies according to example embodiments of the present disclosure. One or more portions of the method 1000 can be executed and/or implemented on one or more computing devices or computing systems including, for example, the computing system 110, the remote computing system 130, the one or more computing devices 152, and/or the computing device 200. Further, one or more portions of the method 1000 can be executed or implemented as an algorithm on the hardware devices or systems disclosed herein. FIG. 10 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1002, the method 1000 can include accessing a security request. The security request can be associated with generating a security policy for organizational data that includes one or more organizational records. Further, the security request can include one or more rules associated with the security policy. For example, the computing system 110 can access data including a security request that includes one or more rules that can be used to establish an authentication policy that is used to authenticate users attempting to access a computing application.

At 1004, the method 1000 can include determining, based at least in part on the security request, the one or more rules that are in compliance with one or more policies associated with the organizational data. For example, the computing system 110 can compare the one or more rules to the one or more policies and determine that the one or more rules are in compliance with the one or more policies if each of the one or more rules does not conflict with any of the one or more policies. The one or more rules conflicting with the one or more policies can include the one or more rules directed to performing an action and/or operation that is not authorized by the one or more policies and/or that contradict the one or more policies.

At 1006, the method 1000 can include generating the security policy based at least in part on the one or more rules that are in compliance with the one or more policies. For example, the computing system 110 can generate a security policy that includes the set of one or more rules that do not conflict with the one or more policies and excludes the set of one or more rules that conflict with the one or more rules.

At 1008, the method 1000 can include performing one or more operations associated with implementing the security policy on the organizational data. For example, the computing system 110 can implement the security policy on one or more applications accessed by one or more users associated with the organizational data. Implementing the security policy may, for example, include the computing system 110 limiting access to the one or more applications based at least in part on an authorization level of a user seeking to access the one or more applications.

Figure 11:
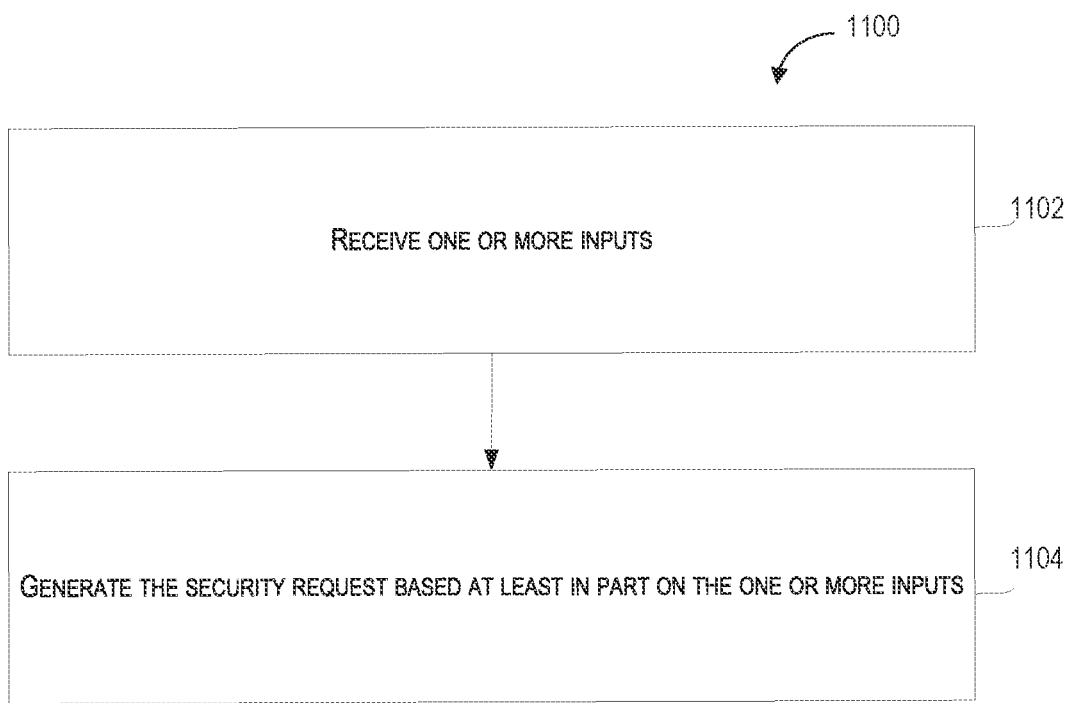
FIG. 11 depicts a flow diagram of generating and implementing security policies according to example embodiments of the present disclosure.

FIG. 11 depicts a flow diagram of generating and implementing security policies according to example embodiments of the present disclosure. One or more portions of the method 1100 can be executed and/or implemented on one or more computing devices or computing systems including, for example, the computing system 110, the remote computing system 130, the one or more computing devices 152, and/or the computing device 200. Further, one or more portions of the method 1100 can be executed or implemented as an algorithm on the hardware devices or systems disclosed herein. FIG. 11 depicts steps performed in a particular order for purposes of illustration and discussion. In some embodiments, one or more portions of the method 1100 can be performed as part of the method 1000 that is depicted in FIG. 10. Those of ordinary skill in the art, using the disclosures provided herein, will understand that various steps of any of the methods disclosed herein can be adapted, modified, rearranged, omitted, and/or expanded without deviating from the scope of the present disclosure.

At 1102, the method 1100 can include receiving one or more inputs via a graphical user interface configured to display one or more interface elements associated with the one or more rules. For example, the computing system 110 can generate the graphical user interface on a touch-screen display that a user can interact with. Further, the graphical user interface can be configured to receive and/or detect one or more inputs including one or more touch inputs from a user. The one or more interface elements associated with the one or more rules can be used to generate and/or configure the security policy.

At 1104, the method 1100 can include generating the security request based at least in part on the one or more inputs. For example, the computing system 110 can generate the security request based at least in part on a user's inputs to the one or more interface elements associated with the one or more rules displayed on a touch-screen display of the computing system 110. The one or more rules can, for example, include a set of conditions that can be combined to generate a security request. Further, the one or more inputs can include an input that indicates an authorization level of the user, which can be used to determine whether one or more rules can supersede an existing policy (e.g., replace an existing policy or take precedence over an existing policy).

Figure 12:
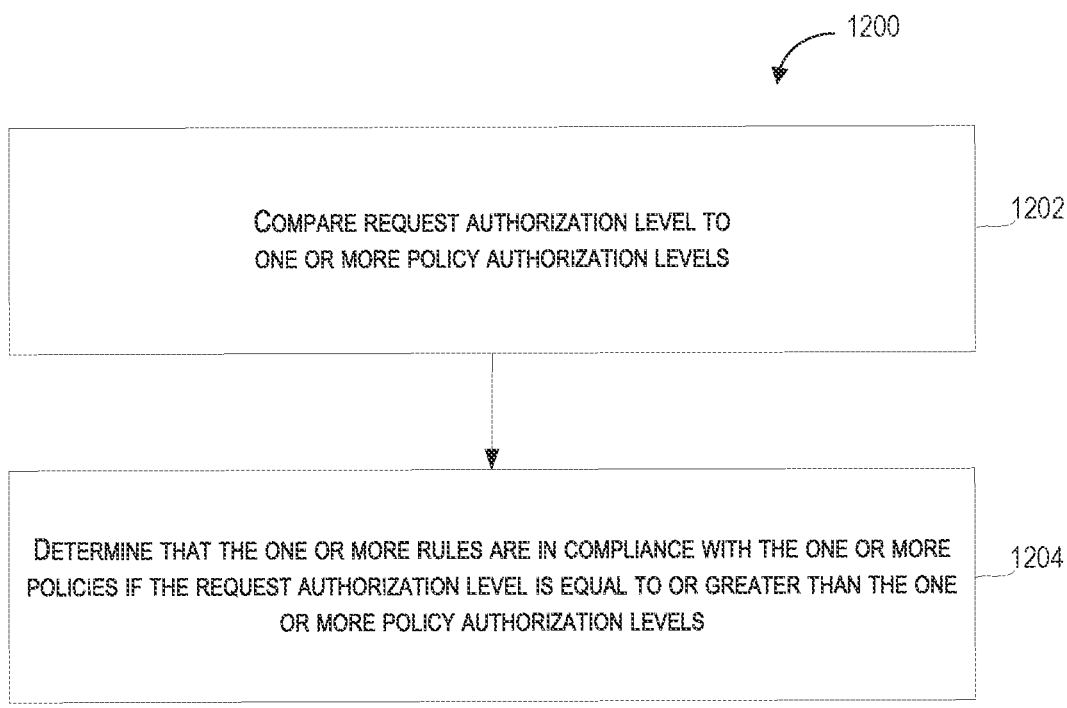
FIG. 12 depicts a flow diagram of generating and implementing security policies according to example embodiments of the present disclosure.

FIG. 12 depicts a flow diagram of generating and implementing security policies according to example embodiments of the present disclosure. One or more portions of the method 1200 can be executed and/or implemented on one or more computing devices and/or computing systems including, for example, the computing system 110, the remote computing system 130, the one or more computing devices 152, and/or the computing device 200. Further, one or more portions of the method 1200 can be executed or implemented as an algorithm on the hardware devices or systems disclosed herein. FIG. 12 depicts steps performed in a particular order for purposes of illustration and discussion. In some embodiments, one or more portions of the method 1200 can be performed as part of the method 1000 that is depicted in FIG. 10. Those of ordinary skill in the art, using the disclosures provided herein, will understand that various steps of any of the methods disclosed herein can be adapted, modified, rearranged, omitted, and/or expanded without deviating from the scope of the present disclosure.

At 1202, the method 1200 can include comparing the request authorization level associated with the one or more rules to the one or more policy authorization levels associated with the one or more policies. The computing system 110 can access organizational data and/or the security request to determine the authorization level and/or the one or more policy authorization levels. The computing system 110 can then compare each of the request authorization levels associated with the one or more rules to each of the one or more policy authorization levels. Based at least in part on the comparison, the computing system 110 can determine one or more similarities and/or one or more differences between the request authorization level and the one or more policy authorization levels.

At 1204, the method 1200 can include determining that the one or more rules are in compliance with the one or more policies if and/or when the request authorization level is equal to or greater than the one or more policy authorization levels. For example, based at least in part on the comparison of the one or more rules to the one or more policies, the computing system 110 can determine that the one or more rules that do not conflict with the one or more policies (e.g., a rule that contradicts a policy or impermissibly goes beyond the scope of a policy) are in compliance with the one or more policies.

Numerous details are set forth in the foregoing description. However, it will be apparent to one of ordinary skill in the art having the benefit of this disclosure that the present disclosure may be practiced without these specific details. In some instances, structures and devices are shown in block diagram form, rather than in detail, to avoid obscuring the present disclosure.

Some portions of the detailed description have been presented in terms of processes and symbolic representations of operations on data bits within a computer memory. Here, a process can include a self-consistent sequence of steps leading to a result. The steps can include those requiring physical manipulations of physical quantities. These quantities can take the form of electrical or magnetic signals capable of being stored, transferred, combined, compared, and otherwise manipulated. These signals can be referred to as bits, values, elements, symbols, characters, terms, numbers, or the like.

These terms and similar terms can be associated with physical quantities and can represent labels applied to these quantities. The terms including "analyzing," "determining," "identifying," "adjusting," "transmitting," "receiving," "processing" "generating," or the like, can refer to the actions and processes of a computer system, a computing device, or similar electronic computing device, that manipulates and transforms data represented as physical (e.g., electronic) quantities within the computer system's registers and memories into other data that can be similarly represented as physical quantities within the computer system's memories, registers, or other information storage device, data transmission device, or data processing device.

Certain examples of the present disclosure can relate to an apparatus for performing the operations described herein. This apparatus may include a computing device that is activated or reconfigured by a computer program comprising electronic instructions stored in the computing device. Such a computer program may be stored in a computer readable storage medium, which can include any type of storage. For example, the storage can include hard disk drives, solid state drives, floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The above description is intended to be illustrative, and not restrictive. The scope of the disclosure can therefore be determined with reference to the appended claims.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for implementing security policies, the computing system comprising:
   one or more processors; and
   one or more non-transitory computer-readable media that store instructions that, when executed by the one or more processors, cause the computing system to perform operations, the operations comprising:
      receiving an access request associated with a particular employee and a particular computing resource;
      accessing a user-customized security policy associated with the particular employee or the particular computing resource, wherein the user-customized security policy is defined using one or more references to a set of organizational data comprising employee data records for employees of an organization;
      determining a policy evaluation outcome comprising:
         comparing the one or more references to the set of organizational data with an employee data record associated with the particular employee;
         executing one or more query language expressions against the set of organizational data to determine a query result, the set of organizational data comprises an object database represented as a graph with nodes and edges;
         traversing the graph based on the query language expressions to determine the query result; and
         determining the policy evaluation outcome based at least in part on the query result; and
      providing a response to the access request based at least in part on the policy evaluation outcome.

2. The computing system of claim 1, wherein the user-customized security policy comprises one or more query language expressions.

3. The computing system of claim 2, wherein the nodes correspond to objects and the edges correspond to logical associations between objects or object attributes.

4. The computing system of claim 3, wherein:
   the set of organizational data comprises organizational structure data encoded within the edges of the graph; and
   traversing the graph based on the query language expressions to determine the query result comprises traversing at least one of the edges of the graph that encodes organizational structure data.

5. The computing system of claim 4, wherein:
   the user-customized security policy is defined for a group of users included in a set of users; and
   traversing at least one of the edges of the graph that encodes organizational structure data comprises traversing an edge of the graph that encodes membership of the particular employee within the group of users.

6. The computing system of claim 2, wherein:
   executing the one or more query language expressions against the set of organizational data to determine the query result comprises executing the one or more query language expressions against the set of organizational data to determine two or more actions performed by the particular employee; and
   determining the policy evaluation outcome based at least in part on the query result comprises determining the policy evaluation outcome based at least in part on application of the user-customized security policy to the two or more actions.

7. The computing system of claim 6, wherein the user-customized security policy comprises a behavior detection security policy that screens for impossible velocity between two logins or login attempts associated with the particular employee.

8. The computing system of claim 2, wherein the one or more query language expressions are expressed in a declarative query language.

9. The computing system of claim 2, wherein executing the one or more query language expressions against the set of organizational data to determine the query result comprises executing the one or more query language expressions against the set of organizational data to determine a Boolean query result.

10. The computing system of claim 1, wherein providing the response to the access request based at least in part on the policy evaluation outcome comprises specifying one or more additional security requirements.

11. The computing system of claim 1, wherein the user-customized security policy has been defined via a user interface.

12. A computer-implemented method, comprising:
receiving an access request associated with a particular employee and a particular computing resource;
accessing a user-customized security policy associated with the particular employee or the particular computing resource, wherein the user-customized security policy is defined using one or more references to a set of organizational data comprising employee data records for employees of an organization;
determining a policy evaluation outcome comprising:
comparing the one or more references to the set of organizational data with an employee data record associated with the particular employee;
executing one or more query language expressions against the set of organizational data to determine a query result, the set of organizational data comprises an object database represented as a graph with nodes;
traversing the graph based on the query language expressions to determine the query result; and
determining the policy evaluation outcome based at least in part on the query result; and
providing a response to the access request based at least in part on the policy evaluation outcome.

13. The computer-implemented method of claim 12, wherein
the user-customized security policy comprises one or more query language expressions.

14. The computer-implemented method of claim 13, wherein
the nodes correspond to objects and the edges correspond to logical associations between objects or object attributes.

15. The computer-implemented method of claim 14, wherein:
the set of organizational data comprises organizational structure data encoded within the edges of the graph; and
traversing the graph based on the query language expressions to determine the query result comprises traversing at least one of the edges of the graph that encodes organizational structure data.

16. The computer-implemented method of claim 15, wherein:
the user-customized security policy is defined for a group of users included in a set of users; and
traversing at least one of the edges of the graph that encodes organizational structure data comprises traversing an edge of the graph that encodes membership of the particular employee within the group of users.

17. The computer-implemented method of claim 13, wherein:
executing the one or more query language expressions against the set of organizational data to determine the query result comprises executing the one or more query language expressions against the set of organizational data to determine two or more actions performed by the particular employee; and
determining the policy evaluation outcome based at least in part on the query result comprises determining the policy evaluation outcome based at least in part on application of the user-customized security policy to the two or more actions.

18. The computer-implemented method of claim 17, wherein the user-customized security policy comprises a behavior detection security policy that screens for impossible velocity between two logins or login attempts associated with the particular employee.

19. The computer-implemented method of claim 13, wherein the one or more query language expressions are expressed in a declarative query language.

20. The computer-implemented method of claim 13, wherein executing the one or more query language expressions against the set of organizational data to determine the query result comprises executing the one or more query language expressions against the set of organizational data to determine a Boolean query result.

* * * * *